United States Patent
Inoue et al.

(10) Patent No.: US 9,987,824 B2
(45) Date of Patent: Jun. 5, 2018

(54) METAL-RESIN COMPOSITE STRUCTURE AND METAL MEMBER

(71) Applicant: Mitsui Chemicals, Inc., Minato-ku, Tokyo (JP)

(72) Inventors: Goro Inoue, Sodegaura (JP); Yuki Kondo, Ichihara (JP); Haruka Takamatsu, Yokohama (JP); Kazuki Kimura, Ichihara (JP); Masaki Misumi, Yokohama (JP); Hiroshi Okumura, Ichihara (JP)

(73) Assignee: MITSUI CHEMICALS, INC., Tokyo (JP)

( * ) Notice: Subject to any disclaimer, the term of this patent is extended or adjusted under 35 U.S.C. 154(b) by 0 days. days.

(21) Appl. No.: 14/423,982

(22) PCT Filed: Jul. 17, 2014

(86) PCT No.: PCT/JP2014/069111
§ 371 (c)(1),
(2) Date: Feb. 25, 2015

(87) PCT Pub. No.: WO2015/008847
PCT Pub. Date: Jan. 22, 2015

(65) Prior Publication Data
US 2015/0224742 A1    Aug. 13, 2015

(30) Foreign Application Priority Data

Jul. 18, 2013 (JP) .................................. 2013-149031
Aug. 9, 2013 (JP) .................................. 2013-166751
(Continued)

(51) Int. Cl.
B32B 7/04 (2006.01)
B32B 3/26 (2006.01)
(Continued)

(52) U.S. Cl.
CPC .......... *B32B 7/04* (2013.01); *B29C 45/14311* (2013.01); *B32B 3/263* (2013.01);
(Continued)

(58) Field of Classification Search
CPC ........... B32B 3/263; B32B 7/04; B32B 15/08; B32B 15/082; B32B 15/085;
(Continued)

(56) References Cited

U.S. PATENT DOCUMENTS

2009/0117401 A1 *  5/2009  Naritomi ................. B29C 45/14
                                                      428/545
2010/0316878 A1    12/2010  Naritomi et al.
(Continued)

FOREIGN PATENT DOCUMENTS

JP    06-041471 A      2/1994
JP    8041660 A   †   2/1996
(Continued)

OTHER PUBLICATIONS

Kubiak et al, Wettability versus roughness of engineering surfaces, Elsevier, Wear 271 (2011), pp. 523-528.*
(Continued)

*Primary Examiner* — Monique Jackson
(74) *Attorney, Agent, or Firm* — Foley & Lardner LLP

(57) ABSTRACT

A metal-resin composite structure (106) is obtained by bonding a metal member (103) and a resin member (105) formed of a thermoplastic resin composition (P) to each other. Regarding six linear portions in total on a surface (110) of the metal member (103) including three arbitrary linear portions which are parallel to each other and another three arbitrary linear portions which are perpendicular to the former three linear portions, a surface roughness measured according to JIS B0601 (corresponding international standard: ISO4287) satisfies the following requirements (1) and (2) at the same time:

(Continued)

(1) material ratio of the roughness profile (Rmr) of one or more linear portions at a cutting level of 20% and an evaluation length of 4 mm are lower than or equal to 30%; and
(2) ten point average roughnesses (Rz) of all the linear portions at an evaluation length of 4 mm are greater than 2 µm.

11 Claims, 8 Drawing Sheets

(30) Foreign Application Priority Data

Nov. 14, 2013 (JP) .................................. 2013-235731
Jul. 4, 2014 (JP) .................................. 2014-138787

(51) Int. Cl.
| | |
|---|---|
| *B32B 15/08* | (2006.01) |
| *B32B 15/085* | (2006.01) |
| *B32B 15/20* | (2006.01) |
| *C23F 1/20* | (2006.01) |
| *B29C 45/14* | (2006.01) |
| *B32B 15/09* | (2006.01) |
| *C09D 109/02* | (2006.01) |
| *C09D 123/12* | (2006.01) |
| *C09D 125/06* | (2006.01) |
| *C09D 125/12* | (2006.01) |
| *C09D 133/12* | (2006.01) |
| *C09D 133/20* | (2006.01) |
| *C09D 167/00* | (2006.01) |
| *C09D 169/00* | (2006.01) |
| *C09D 171/00* | (2006.01) |
| *C09D 177/00* | (2006.01) |
| *C09D 179/08* | (2006.01) |
| *C09D 181/06* | (2006.01) |
| *B29K 705/00* | (2006.01) |

(52) U.S. Cl.
CPC ............ *B32B 15/08* (2013.01); *B32B 15/085* (2013.01); *B32B 15/09* (2013.01); *B32B 15/20* (2013.01); *C09D 109/02* (2013.01); *C09D 123/12* (2013.01); *C09D 125/06* (2013.01); *C09D 125/12* (2013.01); *C09D 133/12* (2013.01); *C09D 133/20* (2013.01); *C09D 167/00* (2013.01); *C09D 169/00* (2013.01); *C09D 171/00* (2013.01); *C09D 177/00* (2013.01); *C09D 179/08* (2013.01); *C09D 181/06* (2013.01); *C23F 1/20* (2013.01); *B29K 2705/00* (2013.01); *B32B 2262/101* (2013.01); *B32B 2307/538* (2013.01); *Y10T 428/12993* (2015.01); *Y10T 428/31507* (2015.04); *Y10T 428/31678* (2015.04); *Y10T 428/31681* (2015.04); *Y10T 428/31692* (2015.04)

(58) Field of Classification Search
CPC ....... B32B 15/088; B32B 15/09; B32B 15/20; B32B 2307/538; B29C 45/14311
See application file for complete search history.

(56) References Cited

U.S. PATENT DOCUMENTS

| | | | | |
|---|---|---|---|---|
| 2011/0297288 | A1* | 12/2011 | Ohara | ................... B29C 33/424 |
| | | | | 152/525 |
| 2012/0049418 | A1* | 3/2012 | Sano | ....................... B29C 33/02 |
| | | | | 264/501 |
| 2012/0237755 | A1* | 9/2012 | Chang | ............... B29C 45/14311 |
| | | | | 428/306.6 |
| 2014/0054175 | A1* | 2/2014 | Kusunoki | ................ C25D 3/32 |
| | | | | 205/50 |

FOREIGN PATENT DOCUMENTS

| | | | |
|---|---|---|---|
| JP | 8046116 A † | | 2/1996 |
| JP | 2002-003805 A | | 1/2002 |
| JP | 2002-241670 A | | 8/2002 |
| JP | 2003-002950 A | | 1/2003 |
| JP | 2003-226728 A | | 8/2003 |
| JP | 2004-216425 A | | 8/2004 |
| JP | 2009-006721 A | | 1/2009 |
| JP | 2010-137475 A | | 6/2010 |
| JP | 2010-274600 A | | 12/2010 |
| JP | 2011124142 A † | | 6/2011 |
| JP | 2013-052671 A | | 3/2013 |
| JP | 2013052671 A | * | 3/2013 |
| WO | WO-03/064150 A1 | | 8/2003 |
| WO | WO-2004/055248 A1 | | 7/2004 |
| WO | WO-2008/047811 A1 | | 4/2008 |
| WO | WO-2013/011769 A1 | | 1/2013 |

OTHER PUBLICATIONS

Bariani et al, Aluminum sheet surface roughness correlation with adhesion in polymer metal hybrid overmolding, Elsevier, CIRP—Annals—Manufacturing Technology 60 (2011), pp. 559-562.*
Twarog, Copper Alloys, Cast Copper Alloys, Kirk-Othmer Encyclopedia of Chemical Technology, 2000, pp. 1-27.*
Caron, Copper Alloys, Wrought, Kirk-Othmer Encyclopedia of Chemical Technology, 2004, vol. 7, pp. 720-766.*
Written Opinion and International Search Report dated Oct. 7, 2014 issued in Application No. PCT/JP2014/069111.
Daniel A. Scola, Polyimide Resins, 15 pages, in ASM Handbook, Composites, vol. 21, 10th Edition, Dec. 1, 2001, US.†

* cited by examiner
† cited by third party

METAL-RESIN COMPOSITE STRUCTURE AND METAL MEMBER

CROSS REFERENCE TO RELATED APPLICATIONS

This application is the National Phase of PCT/JP2014/069111, filed Jul. 17, 2014, which claims priority to Japanese Application No. 2014-138787, filed Jul. 4, 2014; Japanese Application No. 2013-235731, filed Nov. 14, 2013; Japanese Application No. 2013-166751, filed Aug. 9, 2013; and Japanese Application No. 2013-149031, filed Jul. 18, 2013.

TECHNICAL FIELD

The present invention relates to a metal-resin composite structure and a metal member.

BACKGROUND ART

From the viewpoint of reducing the weight of various components, a resin is used as a substitute of metal. However, there are many cases where it is difficult to substitute all the metal components with a resin. In this case, a technique of integrally bonding a metal molded article and a resin molded article to each other to manufacture a new composite component is considered. However, a technique of integrally bonding a metal molded article and a resin molded article to each other using an industrially advantageous method with high bond strength has not been put into practice.

Recently, as a technique of integrally bonding a metal molded article and a resin molded article to each other, a technique of bonding a metal member on which a fine concavo-convex portion is formed to an engineering plastic having a polar group which has affinity to the metal member is considered (for example, Patent Documents 1 to 5).

For example, Patent Documents 1 to 3 disclose techniques of dipping an aluminum alloy in an aqueous hydrazine solution to form a concave portion having a diameter of 30 nm to 300 nm on a surface of the aluminum alloy, and then bonding a polybutylene terephthalate resin (hereinafter referred to as "PBT") or a polyphenylene sulfide resin (hereinafter referred to as "PPS") to the treated surface.

In addition, Patent Document 4 discloses a technique of anodizing an aluminum raw material in an electrolytic bath of phosphoric acid or sodium hydroxide to form an anodic oxidation coating having a concave portion with a diameter of greater than or equal to 25 nm on a surface of the aluminum raw material, and bonding an engineering plastic to the treated surface.

Further, Patent Document 5 discloses a technique of forming a fine concavo-convex portion or a hole on an aluminum alloy using a specific etchant, and then injecting and bonding a polyamide 6 resin, a polyamide 66 resin, or PPS to the hole.

In Patent Documents 1 to 5, an engineering plastic having a polar group is used as a resin member. On the other hand, regarding a non-polar polyolefin resin not having affinity to a metal member, examples of a case to which the above-described technique is applied include an acid-modified polyolefin resin in which a polar group is introduced into a polyolefin resin (Patent Document 6). However, in order to bond the resin and a metal member to each other, it is necessary that the metal member and the resin be in contact with each other under high pressure for a long period of time in a state where the resin is melted, and the bonding is performed using a lamination method by melt extrusion, a press method, or the like. However, a lamination method, a press method, or the like has a low degree of freedom for the applicable shape and has a problem in that the performance and appearance of a metal member cannot be utilized depending on the shape of the member when the acid-modified polyolefin resin is bonded to a portion of the member other than a bonding target area.

In addition, in the related art, an oil-based coating material is used as a coating material of a metal member used for home electronics, construction materials, or automobiles. However, recently, the use of a water-based coating material has increased instead of the oil-based coating material from the viewpoints of reduction in environmental pollution, occupational health, and safety. As a coating component (resin component) contained in these water-based coating materials, for example, an epoxy resin, an acrylic resin, a polyester resin, or a polyurethane resin is used.

Examples of the coating component in the related art include an water-based dispersion composition (Patent Document 7) that is obtained by a reaction of an ethylene-unsaturated carboxylic acid copolymer and an epoxy compound; a water-based rust preventive coating composition (Patent Document 8) that includes a vinyl-based copolymer having a hydrolyzable silyl group and an aminimide group, an uncured epoxy resin, and a rust preventive pigment; a water-based resin composition (Patent Document 9) in which a modifier component containing at least one compound of a diketone compound, a keto ester compound, a ketimine compound, and a benzotriazole compound, a bisphenol type epoxy resin, and a phosphate compound are used; and a water-dispersible urethane compound (Patent Document 10) that contains a dicarboxylic acid dihydrazide compound.

However, even when a water-based coating material containing the above-described resin composition is used, coating adhesion to a metal surface is not sufficiently satisfactory.

RELATED DOCUMENT

Patent Document

[Patent Document 1] Japanese Unexamined Patent Publication No. 2004-216425
[Patent Document 2] Japanese Unexamined Patent Publication No. 2009-6721
[Patent Document 3] Pamphlet of International Publication No. WO 2003/064150
[Patent Document 4] Pamphlet of International Publication No. WO 2004/055248
[Patent Document 5] Japanese Unexamined Patent Publication No. 2013-52671
[Patent Document 6] Japanese Unexamined Patent Publication No. 2002-3805
[Patent Document 7] Japanese Unexamined Patent Publication No. 2002-241670
[Patent Document 8] Japanese Unexamined Patent Publication No. H06-41471
[Patent Document 9] Japanese Unexamined Patent Publication No. 2003-2950
[Patent Document 10] Japanese Unexamined Patent Publication No. 2003-226728

DISCLOSURE OF THE INVENTION

According to investigation by the present inventors, it was clarified that the bond strength of a metal-resin composite structure obtained using any one of the methods disclosed in Patent Documents 1 to 10 is not sufficiently satisfactory. In particular, for example, when a non-polar thermoplastic resin such as a polyolefin resin having low affinity to a metal member, a thermoplastic resin having a high melting point which is a so-called super engineering plastic, a thermoplastic resin having a glass transition temperature of higher than or equal to 140° C., an amorphous thermoplastic resin, or a coating film formed of a water-based coating material is used as a resin member, the bond strength of the metal-resin composite structure deteriorates.

The present invention has been made in consideration of the above-described circumstances, and an object thereof is to provide a metal-resin composite structure in which a metal member and a resin member formed of a thermoplastic resin composition can be directly bonded to each other without deterioration or the like of the resin, and the bond strength between the metal member and the resin member is excellent.

In addition, another object of the present invention is to provide a metal-resin composite structure in which coating adhesion to a metal surface is significantly improved. Still another object of the present invention is to provide a metal-resin composite structure in which coating adhesion is high even when a resin coating film formed on a metal surface is formed of a water-based coating material.

The present inventors have investigated a configuration in which a ten point average roughness (Rz) of a surface of a metal member is adjusted in order to improve the bond strength between the metal member and a resin member formed of a thermoplastic resin composition.

However, it was clarified that, with only the configuration of adjusting a ten point average roughness (Rz) of a surface of a metal member, the bond strength between the metal member and a resin member cannot be sufficiently improved.

Therefore, the present inventors have investigated more thoroughly on design criteria for improving the bond strength between a metal member and a resin member formed of a thermoplastic resin composition. As a result, the present inventors have found that a material ratio of the roughness profile (Rmr) of a metal member surface is effective as one of the design criteria, thereby completing the present invention.

That is, according to the present invention, a metal-resin composite structure and a metal member described below are provided.

[1]
A metal-resin composite structure which is obtained by bonding a metal member and a resin member formed of a thermoplastic resin composition to each other,
in which regarding six linear portions in total on a surface of the metal member including three arbitrary linear portions which are parallel to each other and another three arbitrary linear portions which are perpendicular to the former three linear portions, a surface roughness measured according to JIS B0601 (corresponding international standard: ISO4287) satisfies the following requirements (1) and (2) at the same time:
(1) material ratio of the roughness profile (Rmr) of one or more linear portions at a cutting level of 20% and an evaluation length of 4 mm are lower than or equal to 30%; and
(2) ten point average roughnesses (Rz) of all the linear portions at an evaluation length of 4 mm are greater than 2 μm.

[2]
The metal-resin composite structure according to [1],
in which regarding the six linear portions in total on the surface of the metal member including three arbitrary linear portions which are parallel to each other and another three arbitrary linear portions which are perpendicular to the former three linear portions, the surface roughness measured according to JIS B0601 (corresponding international standard: ISO4287) further satisfies the following requirement (3):
(3) material ratio of the roughness profile (Rmr) of one or more linear portions at a cutting level of 40% and an evaluation length of 4 mm are lower than or equal to 60%.

The metal-resin composite structure according to [1] or [2],
in which regarding the six linear portions in total on the surface of the metal member including three arbitrary linear portions which are parallel to each other and another three arbitrary linear portions which are perpendicular to the former three linear portions, the ten point average roughnesses (Rz) of all the linear portions are greater than 5 μm.

[4]
The metal-resin composite structure according to [3],
in which regarding the six linear portions in total on the surface of the metal member including three arbitrary linear portions which are parallel to each other and another three arbitrary linear portions which are perpendicular to the former three linear portions, the ten point average roughnesses (Rz) of all the linear portions are greater than or equal to 15 μm.

[5]
The metal-resin composite structure according to any one of [1] to [4],
in which regarding the six linear portions in total on the surface of the metal member including three arbitrary linear portions which are parallel to each other and another three arbitrary linear portions which are perpendicular to the former three linear portions, the surface roughness measured according to JIS B0601 (corresponding international standard: ISO4287) further satisfies the following requirement (4):
(4) mean width of the profile elements (RSm) of all the linear portions are greater than 10 μm and less than 300 μm.

[6]
The metal-resin composite structure according to any one of [1] to [5],
in which the surface of the metal member is roughened,
the roughening is performed using an acidic etchant in a final step of the roughening process of the metal member, and
the acidic etchant contains at least either ferric ions or cupric ions and an acid.

[7]
The metal-resin composite structure according to [6],
in which the metal member is washed by ultrasonic cleaning after the roughening process.

[8]
The metal-resin composite structure according to any one of [1] to [7],
in which the metal member is formed of a metal material containing one or two or more metals selected from aluminum and aluminum alloys.

[9]
The metal-resin composite structure according to any one of [1] to [8],
in which the thermoplastic resin composition contains one or two or more thermoplastic resins selected from polyolefin resins, polyester resins, and polyamide resins.

[10]

The metal-resin composite structure according to any one of [1] to [8], in which the thermoplastic resin composition contains one or two or more thermoplastic resins selected from polycarbonate resins, polyether ether ketone resins, polyether ketone resins, polyimide resins, and polyether sulfone resins all of which have a glass transition temperature of higher than or equal to 140° C.

[11]

The metal-resin composite structure according to any one of [1] to [8], in which the thermoplastic resin composition contains one or two or more amorphous thermoplastic resins selected from polystyrene resins, polyacrylonitrile resins, styrene-acrylonitrile copolymer resins, acrylonitrile-butadiene-styrene copolymer resins, polymethyl methacrylate resins, and polycarbonate resins.

[12]

The metal-resin composite structure according to any one of [1] to [11], in which the resin member is a coating film.

[13]

The metal-resin composite structure according to [12], in which the coating film is obtained by coating the surface of the metal member with a water-based coating material.

[14]

A metal member which is used to be bonded to a resin member formed of a thermoplastic resin composition, in which regarding six linear portions in total on a surface of the metal member including three arbitrary linear portions which are parallel to each other and another three arbitrary linear portions which are perpendicular to the former three linear portions, a surface roughness measured according to JIS B0601 (corresponding international standard: ISO4287) satisfies the following requirements (1) and (2) at the same time:

(1) material ratio of the roughness profile (Rmr) of one or more linear portions at a cutting level of 20% and an evaluation length of 4 mm are lower than or equal to 30%; and (2) ten point average roughnesses (Rz) of all the linear portions at an evaluation length of 4 mm are greater than 2 μm.

[15]

The metal member according to [14], in which regarding the six linear portions in total on the surface of the metal member including three arbitrary linear portions which are parallel to each other and another three arbitrary linear portions which are perpendicular to the former three linear portions, the surface roughness measured according to JIS B0601 (corresponding international standard: ISO4287) further satisfies the following requirement (3):

(3) material ratio of the roughness profile (Rmr) of one or more linear portions at a cutting level of 40% and an evaluation length of 4 mm are lower than or equal to 60%.

[16]

The metal member according to [14] or [15], in which regarding the six linear portions in total on the surface of the metal member including three arbitrary linear portions which are parallel to each other and another three arbitrary linear portions which are perpendicular to the former three linear portions, the ten point average roughnesses (Rz) of all the linear portions are greater than 5 μm.

[17]

The metal member according to [16], in which regarding the six linear portions in total on the surface of the metal member including three arbitrary linear portions which are parallel to each other and another three arbitrary linear portions which are perpendicular to the former three linear portions, the ten point average roughnesses (Rz) of all the linear portions are greater than or equal to 15 μm.

[18]

The metal member according to any one of [14] to [17], in which regarding the six linear portions in total on the surface of the metal member including three arbitrary linear portions which are parallel to each other and another three arbitrary linear portions which are perpendicular to the former three linear portions, the surface roughness measured according to JIS B0601 (corresponding international standard: ISO4287) further satisfies the following requirement (4):

(4) mean width of the profile elements (RSm) of all the linear portions are greater than 10 μm and less than 300 μm.

[19]

The metal member according to any one of [14] to [18], in which the metal member is formed of a metal material containing one or two or more metals selected from aluminum and aluminum alloys.

According to the present invention, a metal-resin composite structure in which the bond strength between a metal member and a resin member formed of a thermoplastic resin composition is excellent can be provided.

In addition, according to the present invention, a metal-resin composite structure in which a resin coating film formed on a surface of a metal member is strongly bonded to the metal member surface can be provided. Further, even when the coating film is formed of a water-based coating material, due to its high coating adhesion, the metal-resin composite structure according to the present invention is excellent from the viewpoints of reduction in environmental pollution, occupational health, and safety.

BRIEF DESCRIPTION OF THE DRAWINGS

The above-described objects and other objects, characteristics, and advantageous effects will be clearly described using a preferable embodiment described below and the accompanying drawings below.

DESCRIPTION OF EMBODIMENTS

Figure 1:
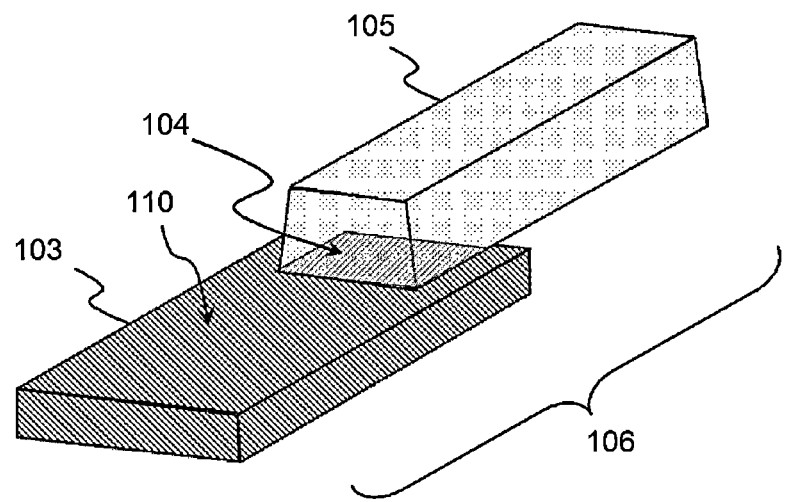
FIG. 1 is an external view schematically showing a structural example of a metal-resin composite structure according to an embodiment of the present invention.

Hereinafter, an embodiment of the present invention will be described using the drawings. In all the drawings, the same components are represented by the same reference numerals, and the description thereof will not be repeated. "To" between numerical values in the specification represents "greater than or equal to and less than or equal to".

[Metal-Resin Composite Structure]

First, a metal-resin composite structure 106 according to the embodiment will be described.

FIG. 1 is an external view schematically showing a structural example of the metal-resin composite structure 106 according to the embodiment of the present invention. In the metal-resin composite structure 106, a metal member 103 and a resin member 105 formed of a thermoplastic resin composition (P) are bonded to each other, and the metal-resin composite structure 106 can be obtained by bonding the metal member 103 and the resin member 105 to each other.

In the embodiment, when the resin member 105 is a coating film, the metal-resin composite structure 106 is also called a coated metal member.

Regarding six linear portions in total on a surface 110 of the metal member including three arbitrary linear portions which are parallel to each other and another three arbitrary linear portions which are perpendicular to the former three linear portions, a surface roughness measured according to JIS B0601 (corresponding international standard: ISO4287) satisfies the following requirements (1) and (2) at the same time:

(1) material ratio of the roughness profile (Rmr) of one or more linear portions at a cutting level of 20% and an evaluation length of 4 mm are lower than or equal to 30%; and (2) ten point average roughnesses (Rz) of all the linear portions at an evaluation length of 4 mm are greater than 2 μm.

The resin member 105 is formed of the thermoplastic resin composition (P) containing a thermoplastic resin (A) as a resin component.

In the metal-resin composite structure 106 according to the embodiment, the thermoplastic resin composition (P) constituting the resin member 105 infiltrates into a concavo-convex portion formed on the surface 110 of the metal member. As a result, metal is bonded to the resin, and the metal-resin composite structure is formed.

On the surface 110 of the metal member 103, the concavo-convex portion suitable for improving the bond strength between the metal member 103 and the resin member 105 is formed. Therefore, the adhesion between the metal member 103 and the resin member 105 can be secured without using an adhesive.

Specifically, it is considered that, by the thermoplastic resin composition (P) infiltrating into the concavo-convex portion of the surface 110 of the metal member which satisfies the requirements (1) and (2) at the same time, a physical resistance force (anchor effect) is efficiently exhibited between the metal member 103 and the resin member 105, and the metal member 103 and the resin member 105 formed of the thermoplastic resin composition (P) which are usually difficult to bond can be strongly bonded to each other.

The metal-resin composite structure 106 obtained as above can also prevent infiltration of moisture or humidity into an interface between the metal member 103 and the resin member 105. That is, air tightness and water tightness of the adhesion interface of the metal-resin composite structure 106 can be improved.

Hereinafter, each member constituting the metal-resin composite structure 106 will be described.

<Metal Member>

Hereinafter, the metal member 103 according to the embodiment will be described.

Regarding six linear portions in total on a surface 110 of the metal member including three arbitrary linear portions which are parallel to each other and another three arbitrary linear portions which are perpendicular to the former three linear portions, a surface roughness measured according to JIS B0601 (corresponding international standard: ISO4287) satisfies the following requirements (1) and (2) at the same time:

(1) material ratio of the roughness profile (Rmr) of one or more linear portions at a cutting level of 20% and an evaluation length of 4 mm are lower than or equal to 30%; and (2) ten point average roughnesses (Rz) of all the linear portions at an evaluation length of 4 mm are greater than 2 μm.

Figure 3:
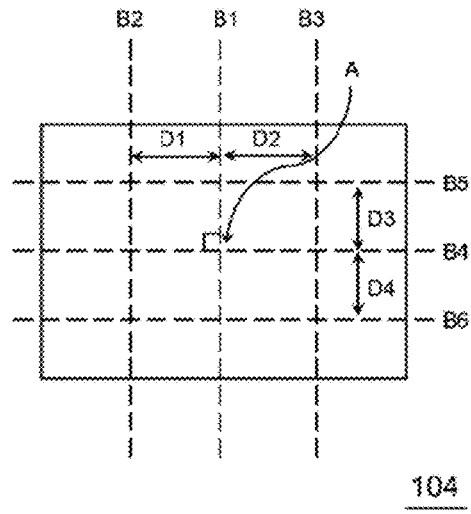
FIG. 3 is a schematic diagram showing measurement positions which are six linear portions in total on a surface of a metal member according to the embodiment including three arbitrary linear portions which are parallel to each other and another three arbitrary linear portions which are perpendicular to the former three linear portions.

FIG. 3 is a schematic diagram showing measurement positions which are the six linear portions in total on the surface 110 of the metal member including three arbitrary linear portions which are parallel to each other and another three arbitrary linear portions which are perpendicular to the former three linear portions.

As the above-described six linear portions, for example, six linear portions B1 to B6 shown in FIG. 3 can be selected. First, as a reference line, the center line B1 which passes through a center portion A of a bonding portion surface 104 of the metal member 103 is selected. Next, the lines B2 and B3 parallel to the center line B1 are selected. Next, the center line B4 perpendicular to the center line B1 is selected, and the lines B5 and B6 perpendicular to the center line B1 and parallel to the center line B4 are selected. Here, vertical distances D1 to D4 between the respective lines are, for example, 2 mm to 5 mm.

Figure 4:
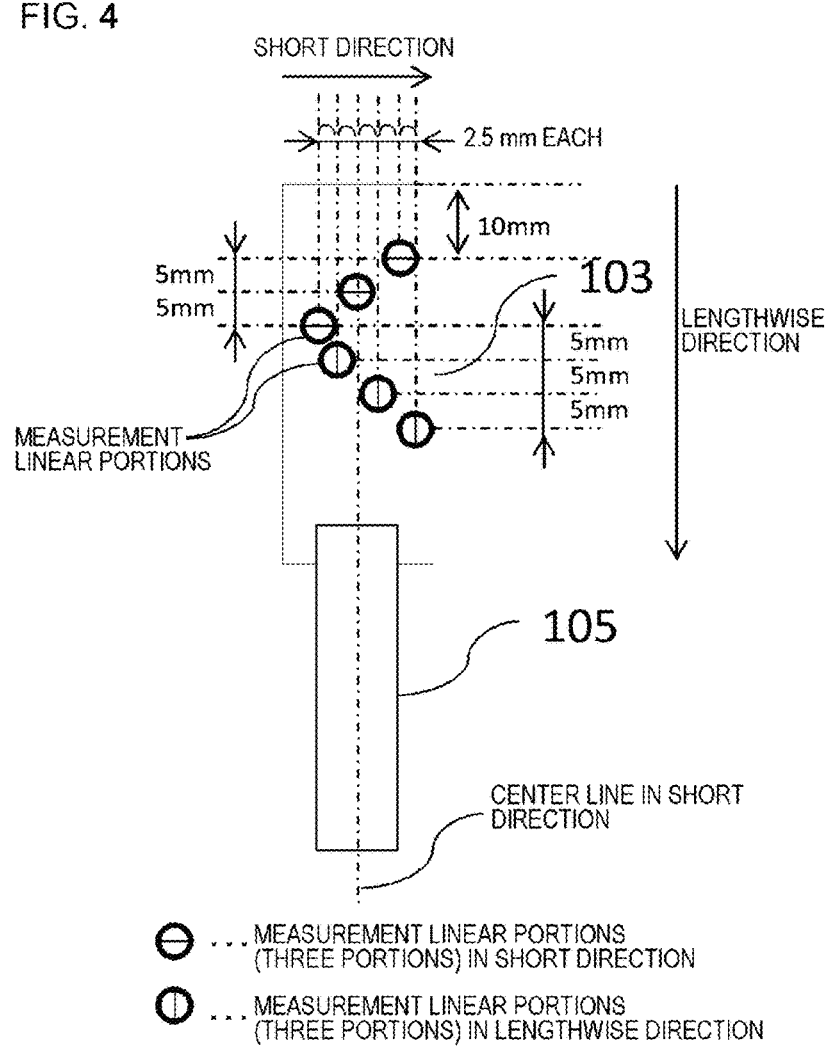
FIG. 4 is a schematic diagram showing measurement positions which are six linear portions in total on a surface of an aluminum plate, which is obtained in each preparation example, including three arbitrary linear portions which are parallel to each other and another three arbitrary linear portions which are perpendicular to the former three linear portions.

Usually, not only the bonding portion surface 104 of the surface 110 of the metal member but the entire portion of the surface 110 of the metal member is roughened. Therefore, for example, as shown in FIG. 4, on the same surface of the bonding portion surface 104 of the metal member 103, six linear portions may be selected from positions other than the bonding portion surface 104.

The reason why the metal-resin composite structure 106 having an excellent bond strength can be obtained when the requirements (1) and (2) are satisfied is not necessarily clear, but is considered to be that the bonding portion surface 104 of the metal member 103 has a structure in which the anchor effect between the metal member 103 and the resin member 105 can be efficiently exhibited.

The present inventors have investigated a configuration in which a ten point average roughness (Rz) of a surface of a metal member is adjusted in order to improve the bond strength between the metal member and a resin member formed of a thermoplastic resin composition.

However, it was clarified that, with only the configuration of adjusting a ten point average roughness (Rz) of a surface of a metal member, the bond strength between the metal member and a resin member cannot be sufficiently improved.

Here, the present inventors thought that the criterion material ratio of the profile is efficient as an index indicating the sharpness of the concavo-convex portion of the metal member surface. A low material ratio of the profile represents high sharpness of the concavo-convex portion of the metal member surface, and a high material ratio of the profile represents low sharpness of the concavo-convex portion of the metal member surface.

Therefore, as one of the design criteria for improving the bond strength between a metal member and a resin member formed of a thermoplastic resin composition, the present inventors have focused on the material ratio of the profile of a roughness curve of a metal member surface and have investigated more thoroughly. As a result, the present inventors have found that, by adjusting a material ratio of the profile of a metal member surface to be lower than or equal to a specific value, the anchor effect between the metal member 103 and the resin member 105 can be efficiently exhibited, and thus the metal-resin composite structure 106 having an excellent bond strength can be realized, thereby completing the present invention.

From the viewpoint of further improving the bond strength between the metal member 103 and the resin member 105, regarding the six linear portions in total on the surface 110 of the metal member including three arbitrary linear portions which are parallel to each other and another three arbitrary linear portions which are perpendicular to the former three linear portions, the surface roughness measured according to JIS B0601 (corresponding international standard: ISO4287) preferably further satisfies one or more requirements and more preferably further satisfies the requirement (1C) among the following requirements (1A) to (1C). The requirement (1C) is the same as the above-described requirement (3).

(1A) material ratio of the roughness profile (Rmr) of preferably two or more linear portions, more preferably three or more linear portions, and most preferably the six linear portions at a cutting level of 20% and an evaluation length of 4 mm are lower than or equal to 30%.

(1B) material ratio of the roughness profile (Rmr) of preferably one or more linear portions, more preferably two or more linear portions, still more preferably three or more linear portions, and most preferably the six linear portions at a cutting level of 20% and an evaluation length of 4 mm are lower than or equal to 20%.

(1C) material ratio of the roughness profile (Rmr) of preferably one or more linear portions, more preferably two or more linear portions, still more preferably three or more linear portions, and most preferably the six linear portions at a cutting level of 40% and an evaluation length of 4 mm are lower than or equal to 60%.

In addition, from the viewpoint of further improving the bond strength between the metal member 103 and the resin member 105, when measured according to JIS B0601 (corresponding international standard: ISO4287), an average value of material ratio of the roughness profile (Rmr) on the surface 110 of the metal member 103 at a cutting level of 20% and an evaluation length of 4 mm is preferably higher than or equal to 0.1% and less than or equal to 40%, more preferably higher than or equal to 0.5% and less than or equal to 30%, still more preferably higher than or equal to 1% and less than or equal to 20%, and most preferably higher than or equal to 2% and less than or equal to 15%.

As the average value of the material ratio of the roughness profile (Rmr), an average value of material ratio of the roughness profile (Rmr) of the above-described six arbitrary linear portions can be adopted.

The respective material ratio of the roughness profile (Rmr) of the surface 110 of the metal member according to the embodiment can be controlled by appropriately adjusting conditions of the roughening on the surface of the metal member 103.

In the embodiment, for example, particularly, the kind and concentration of an etchant, the temperature and time of the roughening, and the timing of etching can be used as factors for controlling the respective material ratio of the roughness profile (Rmr).

From the viewpoint of further improving the bond strength between the metal member 103 and the resin member 105, regarding the six linear portions in total on the surface 110 of the metal member including three arbitrary linear portions which are parallel to each other and another three arbitrary linear portions which are perpendicular to the former three linear portions, the surface roughness measured according to JIS B0601 (corresponding international standard: ISO4287) preferably further satisfies the following requirement (2A):

(2A) ten point average roughnesses (Rz) of all the linear portions at an evaluation length of 4 mm are preferably greater than 5 μm, more preferably greater than or equal to 10 μm, and still more preferably greater than or equal to 15 μm.

From the viewpoint of further improving the bond strength between the metal member 103 and the resin member 105, an average value of ten point average roughnesses (Rz) on the surface 110 of the metal member is preferably greater than 2 μm and less than or equal to 50 μm, more preferably greater than 5 μm and less than or equal to 45 μm, still more preferably greater than or equal to 10 μm and less than or equal to 40 μm, and particularly preferably greater than or equal to 15 μm and less than or equal to 30 μm.

As the average value of the ten point average roughnesses (Rz), an average value of ten point average roughnesses (Rz) of the above-described six arbitrary linear portions can be adopted.

From the viewpoint of further improving the bond strength between the metal member 103 and the resin member 105, regarding the six linear portions in total on the surface 110 of the metal member including three arbitrary linear portions which are parallel to each other and another three arbitrary linear portions which are perpendicular to the former three linear portions, the surface roughness measured according to JIS B0601 (corresponding international standard: ISO4287) preferably further satisfies the following requirement (4):

(4) mean width of the profile elements (RSm) of all the linear portions are greater than 10 μm and less than 300 μm and more preferably greater than or equal to 20 μm and less than or equal to 200 μm.

From the viewpoint of further improving the bond strength between the metal member 103 and the resin member 105, an average value of mean width of the profile elements (RSm) on the surface 110 of the metal member is preferably greater than 10 μm and less than 300 μm and more preferably greater than or equal to 20 μm and less than or equal to 200 μm.

As the average value of the mean width of the profile elements (RSm), an average value of mean width of the profile elements (RSm) of the above-described six arbitrary linear portions can be adopted.

The ten point average roughnesses (Rz) and the mean width of the profile elements (RSm) of the surface 110 of the metal member according to the embodiment can be controlled by appropriately adjusting conditions of the roughening on the surface 110 of the metal member.

In the embodiment, for example, particularly, the temperature and time of the roughening and the etching amount can be used as factors for controlling the ten point average roughnesses (Rz) and the mean width of the profile elements (RSm).

A metal material constituting the metal member 103 is not particularly limited, and examples thereof include iron, stainless steel, aluminum, aluminum alloys, magnesium, magnesium alloys, copper, and copper alloys. These metal materials may be used alone or in a combination of two or more kinds. Among these, from the viewpoints of reducing weight and obtaining high strength, aluminum (aluminum alone) and aluminum alloys are preferable, and aluminum alloys are more preferable.

As the aluminum alloys, for example, Alloy No. 1050, 1100, 2014, 2024, 3003, 5052, and 7075 which are defined according to JIS H4000 are preferably used.

The shape of the metal member 103 is not particularly limited as long as the metal member 103 can be bonded to the resin member 105, and examples thereof include a flat shape, a curved shape, a rod shape, a cylindrical shape, and an agglomerate shape. In addition, a structure having a combination of the above-described shapes may be adopted.

In addition, the shape of the bonding portion surface 104 which is bonded to the resin member 105 is not particularly limited, and examples thereof include a flat shape and a curved shape.

It is preferable that the metal member 103 be formed of the metal material which is roughened as described below after being processed into a predetermined shape by thickness reduction processing such as plastic working by machining or pressing, punching, cutting, polishing, or electric discharge machining. In short, it is preferable that the metal member 103 be processed into a necessary shape using various processing methods.

(Roughening Method of Metal Member Surface)

Next, a roughening method of the surface of the metal member 103 will be described.

The surface of the metal member 103 according to the embodiment can be formed by, for example, roughening using an etchant.

Here, the roughening on the surface of the metal member using an etchant is performed using the related technique. However, in the embodiment, the factors such as the kind and concentration of an etchant, the temperature and time of the roughening, and the timing of etching are highly controlled. In order to obtain the bonding portion surface 104 of the metal member 103 according to the embodiment, it is important to highly control these factors.

Hereinafter, an example of the roughening method of the metal member surface according to the embodiment will be described. However, the roughening method of the metal member surface according to the embodiment is not limited to the following examples.

(1) Pre-Treatment Process

First, it is preferable that a thick film such as an oxide film or a hydroxide not be formed on a surface of the metal member 103 which is bonded to the resin member 105. In order to remove such a thick film, before being treated using an etchant, the surface layer may be polished by mechanical polishing such as sand blasting, shot blasting, grinding or barrel finishing or by chemical polishing. In addition, when the surface of the metal member 103 which is bonded to the resin member 105 is significantly contaminated by machine oil or the like, it is preferable that this surface be treated using an aqueous alkaline solution such as an aqueous sodium hydroxide solution or an aqueous potassium hydroxide solution or be degreased.

(2) Surface-Roughening Process

As a surface-roughening method of the metal member according to the embodiment, it is preferable that a treatment using an acidic etchant described below be performed at a specific timing. Specifically, it is preferable that the treatment using an acidic etchant be performed in a final step of the surface-roughening process.

As the etchant used for the surface-roughening of the metal member which is formed of the metal material containing aluminum, Patent Document 5 described above discloses a configuration of using an alkaline etchant, a configuration of using an alkaline etchant and an acidic etchant in combination, and a configuration of roughening a metal surface using an acidic etchant and then washing the treated surface with an alkaline solution.

The alkaline etchant is moderately reactive to the metal member and thus is preferably used from the viewpoint of workability. However, according to the investigation by the present inventors, it was clarified that, when the alkaline etchant is used, due to its moderate reactivity, the roughening degree of the metal member surface is weak, and it is difficult to form a deep concavo-convex portion. In addition, it was clarified that, when an alkaline etchant or an alkaline solution is used in combination after the treatment using an acidic etchant, a deep concavo-convex portion which is formed using the acidic etchant is smoothened by the alkaline etchant or the alkaline solution.

Accordingly, in a metal member which is treated using the alkaline etchant, or in a metal member which is obtained by using the alkaline etchant or the alkaline solution in a final step of the etching process, it is considered that it is difficult to maintain a high bond strength between the metal member and a resin member formed of a thermoplastic resin composition.

Examples of a roughening method using the acidic etchant include treatment methods using dipping or spraying. The treatment temperature is preferably 20° C. to 40° C., the treatment time is 5 seconds to 350 seconds, and from the viewpoint of further uniformly roughening the metal member surface, is more preferably 20 seconds to 300 seconds and particularly preferably 50 seconds to 300 seconds.

Due to the roughening using the acidic etchant, the surface of the metal member 103 is roughened in a concavo-convex shape. When being calculated from the mass, specific gravity, and surface area of the dissolved metal member 103, the etching amount (dissolved amount) of the metal member 103 in the thickness direction in the case of using the acidic etchant is preferably 0.1 μm to 500 μm, more preferably 5 μm to 500 μm, and still more preferably 5 μm to 100 μm. When the etching amount is greater than or equal to the lower limit, the bond strength between the metal member 103 and the resin member 105 can be further improved. In addition, when the etching amount is less than or equal to the upper limit, the treatment cost can be reduced. The etching amount can be adjusted by the treatment temperature, and the like.

In the embodiment, when the member is roughened using the acidic etchant, the entire surface of the metal member surface may be roughened, or only a surface of the metal member which is bonded to the resin member 105 may be partially roughened.

(3) Post-Treatment Process

In the embodiment, it is preferable that washing and drying be performed after the surface-roughening treatment. A washing method is not particularly limited, but it is preferable that dipping or washing with flowing water for a predetermined amount of time be performed.

Further, as the post-treatment process, it is preferable that ultrasonic cleaning be performed to remove smut and the like formed by the treatment using the acidic etchant. Ultrasonic cleaning conditions are not particularly limited as long as the formed smut and the like can be removed under the conditions. However, water is preferably used as a solvent to be used, and the treatment time is preferably 1 minute to 20 minutes.

(Acidic Etchant)

In the embodiment, as the etchant used for the roughening of the metal member surface, a specific acidic etchant described below is preferably used. It is considered that, by performing the treatment using the specific etchant, a concavo-convex portion suitable for improving the adhesion between the metal member and the resin member containing the thermoplastic resin (A) is formed on the surface of the metal member, and due to this anchor effect, the bond strength between the metal member 103 and the resin member 105 is improved.

In particular, it is preferable that an acidic etchant capable of forming a deeper concavo-convex portion on the metal member surface be used from the viewpoints of: improving the bond strength between the metal member and a resin member, which is not likely to be bonded to the metal member with an ordinary treatment, including a polyolefin resin, a thermoplastic resin having a glass transition temperature of higher than or equal to 140° C., or an amorphous thermoplastic resin; and improving the bond strength between the metal member and a coating film formed of a water-based coating material which is not likely to be bonded to the metal member with an ordinary treatment.

Hereinafter, components of the acidic etchant which can be used in the embodiment will be described.

The acidic etchant contains at least either ferric ions or cupric ions and an acid, and may optionally further contain manganese ions and various additives.

Ferric Ions

The ferric ions are a component that oxidizes the metal member and can be contained in the acidic etchant by mixing a ferric ion source with the acidic etchant. Examples of the ferric ion source include ferric nitrate, ferric sulfate, and ferric chloride. Among the ferric ion sources, ferric chloride is preferably used from the viewpoint of high solubility and low cost.

In the embodiment, the content of the ferric ions in the acidic etchant is preferably 0.01 mass % to 20 mass %, more preferably 0.1 mass % to 12 mass %, still more preferably 0.5 mass % to 7 mass %, even still more preferably 1 mass % to 6 mass %, and particularly preferably 1 mass % to 5 mass %. When the content of the ferric ions is greater than or equal to the lower limit, a decrease in the roughening rate (dissolving rate) of the metal member can be prevented. On the other hand, when the content of the ferric ions is less than or equal to the upper limit, the roughening rate can be appropriately maintained. Therefore, uniform roughening which is more suitable for improving the bond strength between the metal member 103 and the resin member 105 can be performed.

Cupric Ions

The cupric ions are a component that oxidizes the metal member and can be contained in the acidic etchant by mixing a cupric ion source with the acidic etchant. Examples of the cupric ion source include cupric sulfate, cupric chloride, cupric nitrate, and cupric hydroxide. Among the cupric ion sources, cupric sulfate or cupric chloride is preferably used from the viewpoint of high solubility and low cost.

In the embodiment, the content of the cupric ions in the acidic etchant is preferably 0.001 mass % to 10 mass %, more preferably 0.01 mass % to 7 mass %, still more preferably 0.05 mass % to 1 mass %, yet still more preferably 0.1 mass % to 0.8 mass %, even yet still more preferably 0.15 mass % to 0.7 mass %, and particularly preferably 0.15 mass % to 0.4 mass %. When the content of the cupric ions is greater than or equal to the lower limit, a decrease in the roughening rate (dissolving rate) of the metal member can be prevented. On the other hand, when the content of the cupric ions is less than or equal to the upper limit, the roughening rate can be appropriately maintained. Therefore, uniform roughening which is more suitable for improving the bond strength between the metal member 103 and the resin member 105 can be performed.

The acidic etchant may contain either or both of the ferric ions and the cupric ions, but it is preferable that the acidic etchant contain both the ferric ions and the cupric ions. By the acidic etchant containing the ferric ions and the cupric ions, an excellent roughening shape which is more suitable for improving the bond strength between the metal member 103 and the resin member 105 can be easily obtained.

When the acidic etchant contains both the ferric ions and the cupric ions, it is preferable that the respective contents of the ferric ions and the cupric ions be in the above-described ranges. In addition, the total content of the ferric ions and the cupric ions in the acidic etchant is preferably 0.011 mass % to 20 mass %, more preferably 0.1 mass % to 15 mass %, still more preferably 0.5 mass % to 10 mass %, and particularly preferably 1 mass % to 5 mass %.

Manganese Ions

In order to uniformly roughen the metal member surface without unevenness, the acidic etchant may contain manganese ions. The manganese ions can be contained in the acidic etchant by mixing a manganese ion source with the acidic etchant. Examples of the manganese ion source include manganese sulfate, manganese chloride, manganese acetate, manganese fluoride, and manganese nitrate. Among the manganese ion sources, manganese nitrate or manganese chloride is preferably used from the viewpoints of low cost and the like.

In the embodiment, the content of the manganese ions in the acidic etchant is preferably 0 mass % to 1 mass % and more preferably 0 mass % to 0.5 mass %. The present inventors verified that, in a case where the thermoplastic resin (A) constituting the resin member 105 was a polyolefin resin, even when the content of the manganese ions was 0 mass %, a sufficient bond strength was exhibited. That is, when a polyolefin resin is used as the thermoplastic resin (A), it is preferable that the content of the manganese ions be 0 mass %. On the other hand, when a thermoplastic resin other than a polyolefin resin is used, the manganese ions are appropriately used in a content of the above-described upper limit or less.

Acid

The above-described acid is a component that dissolves the metal oxidized by the ferric ions and/or the cupric ions. Examples of the acid include inorganic acids such as hydrochloric acid, hydrobromic acid, sulfuric acid, nitric acid, phosphoric acid, perchloric acid, and sulfamic acid; and organic acids such as sulfonic acid and carboxylic acid. Examples of the carboxylic acid include formic acid, acetic acid, citric acid, oxalic acid, and malic acid. One kind or two or more kinds of the acids can be mixed with the acidic etchant. Among the inorganic acids, sulfuric acid is preferably used from the viewpoint of substantially no odor emission and low cost. In addition, among the organic acids, carboxylic acid is preferably used from the viewpoint of the uniformity of the roughening shape.

In the embodiment, the content of the acid in the acidic etchant is preferably 0.1 mass % to 50 mass %, more preferably 0.5 mass % to 50 mass %, still more preferably 1 mass % to 50 mass %, yet still more preferably 1 mass % to 30 mass %, even yet still more preferably 1 mass % to 25 mass %, and particularly preferably 2 mass % to 18 mass %. When the content of the acid is greater than or equal to the lower limit, a decrease in the roughening rate (dissolving rate) of the metal can be prevented. On the other hand, when the content of the acid is less than or equal to the upper limit, crystal precipitation of a metal salt at a decreased liquid temperature can be prevented, and workability can be improved.

Other Components

To the acidic etchant which can be used in the embodiment, a surfactant for preventing unevenness in roughening caused by a surface contaminant such as a fingerprint may be added, and optionally other additives may also be added. Examples of the additives include halide ion sources which are added to form a deep concavo-convex portion, for example, sodium chloride, potassium chloride, sodium bromide, and potassium bromide. Other examples of the additives include thio compounds which are added to increase the roughening rate, for example, thiosulfate ions and thiourea; azoles which are added to obtain a more uniform roughening shape, for example, imidazole, triazole, and tetrazole; and a pH adjuster which is added to control a roughening reaction. When these other embodiments are added, the total content thereof in the acidic etchant is preferably 0.01 mass % to 10 mass %.

The acidic etchant according to the embodiment can be easily prepared by dissolving the above-described respective components in ion exchange water or the like.

<Resin Member>

Hereinafter, the resin member 105 according to the embodiment will be described.

The resin member 105 is formed of the thermoplastic resin composition (P). The thermoplastic resin composition (P) contains the thermoplastic resin (A) as the resin component and optionally further contains a filler (B). Further, the thermoplastic resin composition (P) optionally further contains other compounding agents. For convenience of description, the resin member 105 being formed of only the thermoplastic resin (A) is described as the resin member 105 being formed of the thermoplastic resin composition (P).

(Thermoplastic Resin (A))

The thermoplastic resin (A) is not particularly limited, and examples thereof include polyolefin resins, polymethacrylic resins such as polymethyl methacrylate resin, polyacrylic resins such as polymethyl acrylate resin, polystyrene resins, polyvinyl alcohol-polyvinyl chloride copolymer resins, polyvinyl acetal resins, polyvinyl butyral resins, polyvinyl formal resins, polymethyl pentene resins, maleic anhydride-styrene copolymer resins, polycarbonate resins, polyphenylene ether resins, aromatic polyether ketones such as polyether ether ketone resins and polyether ketone resins, polyester resins, polyamide resins, polyamide imide resins, polyimide resins, polyether imide resins, styrene elastomers, polyolefin elastomers, polyurethane elastomers, polyester elastomers, polyamide elastomers, ionomers, amino polyacrylamide resins, isobutylene-maleic anhydride copolymers, ABS, ACS, AES, AS, ASA, MBS, ethylene-vinyl chloride copolymers, ethylene-vinyl acetate copolymers, ethylene-vinyl acetate-vinyl chloride graft polymers, ethylene-vinyl alcohol copolymers, chlorinated polyvinyl chloride resins, chlorinated polyethylene resins, chlorinated polypropylene resins, carboxyl vinyl polymers, ketone resins, amorphous copolyester resins, norbornene resins, fluoroplastics, polytetrafluoroethylene resins, fluorinated ethylene polypropylene resins, PFA, polychlorofluoroethylene resins, ethylene-tetrafluoroethylene copolymers, polyvinylidene fluoride resins, polyvinyl fluoride resins, polyarylate resins, thermoplastic polyimide resins, polyvinylidene chloride resins, polyvinyl chloride resins, polyvinyl acetate resins, polysulfone resins, poly-para-methylstyrene resins, polyallylamine resins, polyvinyl ether resins, polyphenylene oxide resins, polyphenylene sulfide (PPS) resins, polymethylpentene resins, oligoester acrylates, xylene resins, maleic acid resins, polyhydroxybutyrate resins, polysulfone resins, polylactic acid resins, polyglutamic acid resins, polycaprolactone resins, polyether sulfone resins, polyacrylonitrile resins, and styrene-acrylonitrile copolymer resins. These thermoplastic resins may be used alone or in a combination of two or more kinds.

Among these, as the thermoplastic resin (A), one or two or more thermoplastic resins selected from polyolefin resins, polyester resins, and polyamide resins are preferably used from the viewpoint of more efficiently obtaining the effect of improving the bond strength between the metal member 103 and the resin member 105.

As the polyolefin resins, polymers obtained by polymerization of olefins can be used without any particular limitation.

Examples of the olefins constituting the polyolefin resins include ethylene, α-olefins, and cyclic olefins.

Examples of the α-olefins include linear or branched α-olefins having 3 to 30 carbon atoms, preferably, 3 to 20 carbon atoms. More specific examples of the α-olefins include propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicosene.

Examples of the cyclic olefins include cyclic olefins having 3 to 30 carbon atoms, preferably, 3 to 20 carbon atoms. More specific examples of the cyclic olefins include cyclopentene, cycloheptene, norbornene, 5-methyl-2-norbornene, tetracyclododecene, and 2-methyl-1,4,5,8-dimethano-1,2,3,4,4a,5,8,8a-octahydronaphthalene.

Preferable examples of the olefins constituting the polyolefin resins include ethylene, propylene, 1-butene, 1-pentene, 3-methyl-1-butene, 1-hexene, 4-methyl-1-pentene, and 3-methyl-1-pentene. Among these, ethylene, propylene, 1-butene, 1-hexene, or 4-methyl-1-pentene are more preferable, and ethylene or propylene is still more preferable.

The polyolefin resins may be obtained by polymerization of one kind of the above-described olefins, or may be obtained by random copolymerization, block copolymerization, or graft copolymerization of two or more kinds of the above-described olefins.

In addition, as the polyolefin resins, those having a linear or branched structure may be used.

Examples of the polyester resins include polylactic acid, polyglycolic acid, polycaprolactone, aliphatic polyester such as polyethylene succinate, polyethylene terephthalate, polyethylene naphthalate, polybutylene terephthalate (PBT), and polycyclohexylenedimethylene terephthalate (PCT).

Examples of the polyamide resins include aliphatic polyamides by ring opening polymerization such as PA6 and PA12; polyamides by polycondensation polymerization such as PA66, PA46, PA610, PA612, and PA11; semi-aromatic polyamides such as MXD6, PA6T, PA9T, PA6T/66, PA6T/6, amorphous PA; and fully aromatic polyamides such as poly(p-phenylene terephthalamide), poly(m-phenylene terephthalamide), and poly(m-phenylene isophthalamide) and amide elastomers.

In addition, as the thermoplastic resin (A), one or two or more thermoplastic resins selected from thermoplastic resins having a glass transition temperature of higher than or equal to 140° C. and amorphous thermoplastic resins are preferably used from the viewpoint of more efficiently obtaining the effect of improving the bond strength between the metal member 103 and the resin member 105.

Examples of the thermoplastic resins having a glass transition temperature of higher than or equal to 140° C. include one or two or more thermoplastic resins selected from polycarbonate resins; aromatic polyether ketones such as polyether ether ketone resins and polyether ketone resins; polyimide resins; and polyether sulfone resins.

Examples of the amorphous thermoplastic resins include one or two or more amorphous thermoplastic resins selected from polystyrene resins, polyacrylonitrile resins, styrene-acrylonitrile copolymer resins, acrylonitrile-butadiene-styrene copolymer resins (ABS resins), polymethyl methacrylate resins, and polycarbonate resins.

In order to promote infiltration into the concavo-convex portion of the surface of the metal member 103, it is preferable that the thermoplastic resin (A) have high fluidity. Therefore, in the embodiment, MFR of the thermoplastic resin (A) which is measured according to ASTM D1238 under a condition of a load of 2.16 kg is preferably 10 g/10 min to 200 g/10 min. MFR can be measured at a temperature which is determined depending on each resin, for example, at 230° C. in the case of a propylene polymer and at 190° C. in the case of an ethylene polymer.

The resin member 105 according to the embodiment may be a coating film. For the coating film, various commercially available coating materials can be used.

The kinds of the coating materials can be broadly classified into an oil-based coating material and a water-based coating material. Examples of the oil-based coating material include coating materials in which a resin such as an acrylic resin, a polyolefin resin, a polyurethane resin, an epoxy resin, a phenol resin, a polyester resin, or an alkyd resin is dissolved in an organic solvent. Examples of the water-based coating material include a coating materials in which a resin such as an acrylic resin, an acrylic silicon resin, a polyolefin resin, a silicon resin, a polyurethane resin, an epoxy resin, a phenol resin, a polyester resin, an alkyd resin, or a biodegradable resin is suspended in water.

The coating film may be formed of either the oil-based coating material or the water-based coating material. Since a deep concavo-convex portion is formed on the surface-roughened metal member 103, a coating resin infiltrates into the concave portion, and a coating film is formed. Therefore, the adhesion of the coating film with metal is high, and it can be expected that the coating film is not likely to be peeled off. In the embodiment, as described above, a deep concavo-convex portion is formed on the surface-roughened metal member 103. Therefore, in particular, as in the case of the water-based coating material, even when a coating resin is suspended in water and the respective molecules of the coating resin form large agglomerates based on the surface tension, the coating resin can infiltrate into the concave portion during coating. Accordingly, the metal-resin composite structure 106 according to the embodiment is excellent from the viewpoint that a coating film having high adhesion can be formed even when the water-based coating material, with which a coating film having high adhesion is not likely to be formed on the metal member surface in the related art, is used.

(Filler (B))

The thermoplastic resin composition (P) may further contain the filler (B) from the viewpoints of adjusting a difference in linear expansion coefficient between the metal member 103 and the resin member 105 and improving a mechanical strength of the resin member 105.

As the filler (B), for example, one or two or more kinds can be selected from the group consisting of glass fiber, carbon fiber, carbon particles, clay, talc, silica, mineral, and cellulose fiber. Among these, one or two or more kinds selected from glass fiber, carbon fiber, talc, and mineral are preferably used.

The shape of the filler (B) is not particularly limited and may be any shape, for example, fibrous, particulate, or plate-like.

It is preferable that the filler (B) contain 5% to 100% of filler particles having a maximum length of longer than or equal to 10 nm and shorter than or equal to 600 μm by number fraction. The maximum length is more preferably longer than or equal to 30 nm and shorter than or equal to 550 μm and still more preferably longer than or equal to 50 nm and shorter than or equal to 500 μm. In addition, the number fraction of the filler (B) particles having a maximum length in the above-described range is preferably 10% to 100% and more preferably 20% to 100%.

When the maximum length of the filler (B) particles is within the above-described range, the filler (B) can easily functions in the thermoplastic resin (A) which is melted during the molding of the thermoplastic resin composition (P). Therefore, during the preparation of the metal-resin composite structure 106 described below, the filler (B) can be made to be present in the vicinity of the metal member surface at a certain ratio. Therefore, the resin which interacts with the filler (B) infiltrates into the concavo-convex portion of the metal member surface as described above and thus can obtain a stronger bond strength.

In addition, when the number fraction is within the above-described range, a sufficient number of the filler (B) particles are present in the thermoplastic resin composition (P) such that the filler (B) can act with the concavo-convex portion of the surface of the metal member 103.

Figure 11:
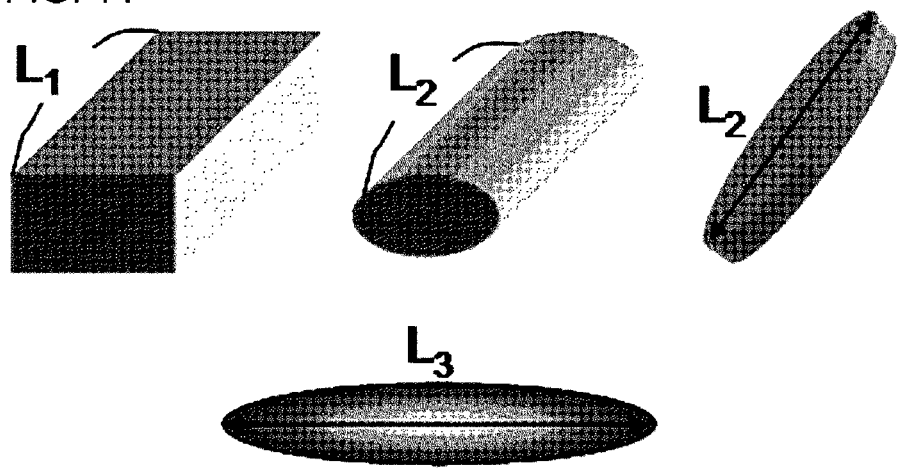
FIG. 11 is a conceptual diagram schematically showing the definition of a maximum length of filler particles.

In order to obtain the length of the filler (B) particles, a member formed of the thermoplastic resin composition (P) is removed from the obtained metal-resin composite structure 106, the thermoplastic resin composition (P) is heated in an oven so as to be completely carbonized, and then the filler (B) remaining after the removal of the carbonized resin is measured with a scanning electron microscope. Here, as indicated by L1 to L3 in the schematic drawing of FIG. 11, the maximum length of the filler (B) particles refers to: the maximum length L1 among the lengths of three sides in the case of a rectangular shape; the longer length L2 among the long-axis diameter length of a circle or the height of a cylinder in the case of a cylindrical shape; and the length L3 of the longest diameter among the long axis diameter lengths of all the cross-sections in the case of a sphere or a spheroid.

In order to obtain the number fraction of the filler (B) particles, the number of all the filler (B) particles in the electron micrograph used to measure the lengths of the filler (B) particle is counted, and the number of filler (B) particles contained in the above-describe range is calculated.

As the filler (B), one kind or two or more kinds thereof may be used. When two or more kinds of fillers are used, the maximum lengths of all the kinds of the filler (B) particles are collectively obtained using the above-described method.

The filler (B) particles may have a maximum length of greater than 600 μm before being kneaded with the thermoplastic resin (A) or may be cut and pulverized during kneading and molding such that the maximum length is within the above-described range.

When the thermoplastic resin composition (P) contains the filler (B), the content of the filler (B) is preferably 1 part by mass to 100 parts by mass, more preferably 5 parts by mass to 90 parts by mass, and particularly preferably 10 parts by mass to 80 parts by mass with respect to 100 parts by mass of the thermoplastic resin (A).

The filler (B) has an effect of controlling the linear expansion coefficient of the resin member 105 as well as an effect of improving the stiffness of the resin member 105. In particular, in the case of a composite of the metal member 103 and the resin member 105 according to the embodiment, there is a large difference in the temperature dependences of shape stability between the metal member 103 and the resin member 105 in many cases. Therefore, when a temperature change is large, strain is likely to be generated in the composite. By the resin member 105 containing the filler (B), this strain can be reduced. In addition, by controlling the content of the filler (B) to be within the above-described range, a decrease in toughness can be suppressed.

(Other Compounding Agents)

The thermoplastic resin composition (P) may contain other compounding agents in order to impart various functions thereto.

Examples of the compounding agent include a heat stabilizer, an antioxidant, a pigment, a weather-resistant agent, a flame retardant, a plasticizer, a dispersant, a lubricant, a release agent, and an antistatic agent.

(Method of Preparing Thermoplastic Resin Composition (P))

A method of preparing the thermoplastic resin composition (P) is not particularly limited, and the thermoplastic resin composition can be prepared using a generally well-known method. For example, the following method may be used. First, the thermoplastic resin (A), optionally the filler (B), and further optionally the other compounding agents are mixed or melt-mixed with each other using a mixing machine such as a Banbury mixer, a single screw extruder, a twin screw extruder, or a high speed twin screw extruder. As a result, the thermoplastic resin composition (P) is obtained.

[Method of Preparing Metal-Resin Composite Structure]

Next, a method of preparing the metal-resin composite structure 106 according to the embodiment will be described.

The method of preparing the metal-resin composite structure 106 is not particularly limited, and can be obtained by bonding the thermoplastic resin composition (P) to the surface-roughened metal member 103 while molding the thermoplastic resin composition (P) to obtain a desired shape of the resin member 105.

Examples of a molding method of the resin member 105 include resin molding methods such as injection molding, extrusion molding, hot press molding, compression molding, transfer molding, cast molding, laser welding molding, reaction injection molding (RIM molding), liquid injection molding (LIM molding), and spray forming.

In addition, when a composite is formed of a metal member-thermoplastic resin composition coating in which a coating of the thermoplastic resin composition (P) is formed on the metal member 103, a method of dissolving or dispersing the thermoplastic resin composition (P) in a solvent to prepare a resin vanish and coating the metal member 103 with this resin vanish or various other coating methods can be adopted. Examples of the other coating method include baking coating, electrodeposition coating, electrostatic coating, powder coating, and ultraviolet curable coating.

Among these, an injection molding method is preferably used as the method of preparing the metal-resin composite structure 106. Specifically, it is preferable that the metal-resin composite structure 106 be prepared using an injection molding method of inserting the metal member 103 into a cavity of an injection mold and injecting the thermoplastic resin composition (P) into the mold. Specifically, a method including the following processes (i) to (iii) is preferable:

(i) a process of preparing the thermoplastic resin composition (P);

(ii) a process of installing the metal member 103 into an injection mold; and (iii) a process of injecting the thermoplastic resin composition (P) into the mold so as to come into contact with at least a part of the metal member 103 to thereby form the resin member 105.

Hereinafter, the respective processes will be described.

In the step (i) of preparing the thermoplastic resin composition (P), the above-described method of preparing the thermoplastic resin composition (P) is used. For example, the thermoplastic resin (A), optionally the filler (B), and further optionally the other compounding agents are mixed or melt-mixed with each other using a mixing machine such as a Banbury mixer, a single screw extruder, a twin screw extruder, or a high speed twin screw extruder. As a result, the thermoplastic resin composition (P) can be obtained.

Next, the injection molding method in the processes (ii) and (iii) will be described.

First, an injection molding mold is prepared, the mold is opened, and the metal member 103 is installed into a part of the mold. Next, the mold is closed, the thermoplastic resin composition (P) obtained in the process (i) is injected into the mold such that at least a part of the thermoplastic resin composition (P) comes into contact with a surface of the metal member 103 on which a concave portion is formed, and the injected thermoplastic resin composition (P) is solidified. Next, the metal-resin composite structure 106 can be obtained by opening and releasing the mold.

In addition, along with the injection molding including the processes (i) to (iii), injection foam molding or rapid heat cycle molding (RHCM, Heat and Cool Molding) of rapidly heating and cooling a mold may be used in combination.

Examples of a method of the injection foam molding include a method of adding a chemical foaming agent to a resin; a method of directly injecting nitrogen gas or carbon dioxide gas into a cylinder portion of an injection molding machine; and a MuCell injection foaming molding method of injecting nitrogen gas or carbon dioxide gas in the supercritical state into a cylinder portion of an injection molding machine. In any of the methods, a metal-resin composite structure in which a resin member is a foam body can be obtained. In addition, in any of the methods, as a method of controlling the mold, a method using counter pressure may be used, or a method using core back may also be used depending on the shape of a molded article.

The rapid heat cycle molding can be performed by connecting the mold to a rapid heating and cooling device. The rapid heating and cooling device may be a commonly-used type. As a heating method, one of methods using steam, pressurized hot water, hot water, an electric heater, and electromagnetic induction heating or a combination of plural methods thereof may be used. As a cooling method, one of methods using cold water and cold oil or a combination thereof may be used. As rapid heat cycle molding conditions, for example, it is preferable that an injection mold be heated at a temperature of higher than or equal to 100° C. and lower than or equal to 250° C., and the injection mold be cooled after the injection of the thermoplastic resin composition (P). A preferable range of the mold heating temperature varies depending on the thermoplastic resin (A) constituting the thermoplastic resin composition (P). When a crystalline resin having a melting point of lower than 200° C. is used, the mold heating temperature is preferably higher than or equal to 100° C. and lower than or equal to 150° C. When a crystalline resin having a melting point of higher than or equal to 200° C. is used, the mold heating temperature is preferably higher than or equal to 140° C. and lower than or equal to 250° C. When an amorphous resin is used, the mold heating temperature is preferably higher than or equal to 50° C. and lower than or equal to 250° C. and more preferably higher than or equal to 100° C. and lower than or equal to 180° C.

Next, a method of forming the coating film on the metal member 103 will be described.

As the method of forming the coating film on the metal member 103, a method of forming a coating film which is used in the related art can be used without any limitation.

For example, the surface of the metal member 103 can be coated with the above-described various coating materials using a method, for example, spray coating such as air spraying or airless spraying, dip coating, brush coating, roller coating, or coater coating.

[Use of Metal-Resin Composite Structure]

The metal-resin composite structure 106 according to the embodiment is applicable to various uses due to its high productivity and high degree of freedom for shape control.

Further, the metal-resin composite structure 106 according to the embodiment exhibits air tightness and water tightness and thus can be preferably used according to the properties.

Examples of the uses of the metal-resin composite structure 106 include structural components for vehicles, components mounted in vehicles, cases of electronic apparatuses, cases of home electronics, structural components, mechanical components, various components for vehicles, components for electronic apparatuses, furniture, household components such as kitchenware, medical equipment, components of construction materials, and other structural components and exterior components.

More specifically, the following components are used, which are designed such that metal supports a portion in which the strength is insufficient with only a resin. Examples of components for vehicles include an instrument panel, a console box, a door knob, a door trim, a shift lever, pedals, a glove box, a bumper, a hood, a fender, a trunk, a door, a roof, a pillar, a seat sheet, a radiator, an oil pan, a steering wheel, an ECU box, and an electrical component. In addition, examples of construction materials and furniture include a glass window frame, a handrail, a curtain rail, a chest of drawers, a drawer, a closet, a bookshelf, a desk, and a chair. In addition, examples of high-precision electronic components include a connector, a relay, and a gear. In addition, examples of shipping casks include a shipping container, a suitcase, and a trunk.

In addition, the metal-resin composite structure 106 can be used for components in which the high thermal conductivity of the metal member 103 and the insulating property of the thermoplastic resin (A) are combined to optimally design heat management, for example, can be used for various home electronics. Specific examples of the home electronics include home electronics such as a refrigerator, a washing machine, a vacuum cleaner, a microwave oven, an air conditioner, an lighting device, an electric water heater, a television, a timepiece, a ventilating fan, a projector, and a speaker; and electronic information devices such as a personal computer, a mobile phone, a smartphone, a digital camera, a tablet PC, a mobile music player, a mobile game machine, a charger, and a battery.

Regarding these components, the surface area thereof increases by roughening the surface of the metal member 103. Therefore, the contact area between the metal member 103 and the resin member 105 increases, and the heat resistance at a contact interface can be reduced.

Examples of other uses of the metal-resin composite structure 106 include toys, sports goods, shoes, sandals, bags, dinnerware such as a fork, a knife, a spoon, or a dish, stationery goods such as a ball-point pen, a mechanical pencil, a file, or a binder, cookware such as a frying pan, a pot, a kettle, a spatula, a ladle, a perforated ladle, a whisk, or tongs, components for lithium ion secondary batteries, and robots.

Hereinabove, the uses of the metal-resin composite structure according to the present invention have been described. However, these uses are merely exemplary, and the present invention is applicable to uses other than the above-described examples.

Hereinabove, the embodiment of the present invention has been described. However, the embodiment is merely exemplary, and various configurations other than the above-described configurations can be adopted.

EXAMPLES

Hereinafter, the embodiment will be described in detail with reference to Examples and Comparative Examples. The embodiment is not limited to the description of these examples.

Figure 2:
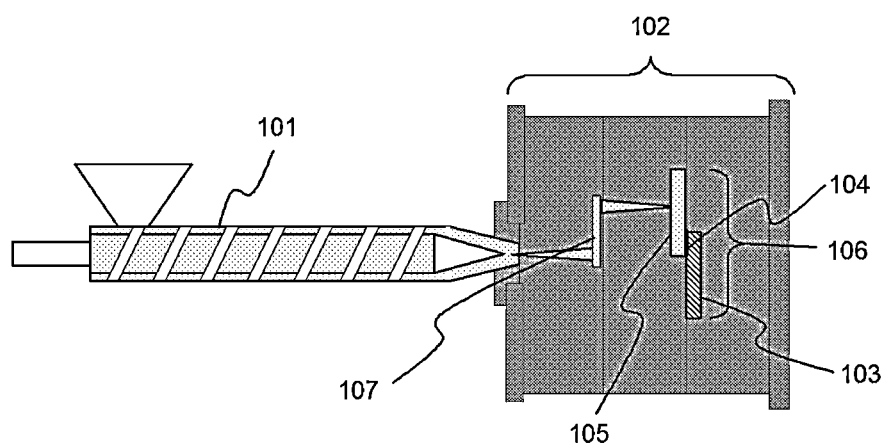
FIG. 2 is a configuration diagram schematically showing an example of a process of preparing the metal-resin composite structure according to the embodiment of the present invention.

FIGS. 1 and 2 are used as drawings common to the respective examples.

FIG. 1 is an external view schematically showing a structural example of the metal-resin composite structure 106 of the metal member 103 and the resin member 105.

FIG. 2 is a configuration diagram schematically showing an example of a process of preparing the metal-resin composite structure 106 using the metal member 103 and the resin member 105. Specifically, the metal member 103, which is processed into a predetermined shape and has a surface on which the bonding portion surface (surface-roughened region) 104 having a fine concavo-convex portion is formed, is installed into an injection mold 102; and the thermoplastic resin composition (P) is injected through a gate-runner 107 using an injection molding machine 101 and is integrated with the metal member 103 on which the fine concavo-convex portion is formed, thereby preparing the metal-resin composite structure 106. These processes are schematically shown in FIG. 2.

(Material Ratio of the Roughness Profile (Rmr), Ten Point Average Roughness (Rz), and Mean Width of the Profile Elements (RSm) on Metal Member Surface)

Regarding the surface roughness which was measured according to JIS B0601 (corresponding international standard: ISO4287) using a surface roughness measuring device "SURFCOM 1400D (manufactured by Tokyo Seimitsu Co., Ltd.)", a material ratio of the roughness profile (Rmr), a ten point average roughness (Rz), and a mean width of the profile elements (RSm) were measured. Measurement conditions were as follows.

Stylus tip radius: 5 μm
Reference length: 0.8 mm
Evaluation length: 4 mm
Measurement speed: 0.06 mm/sec The measurement was performed on six linear portions in total on a surface of a metal member including three arbitrary linear portions which were parallel to each other and another three arbitrary linear portions which were perpendicular to the former three linear portions (refer to FIG. 4). In Examples and Comparative Examples, the entire portion of the surface of the metal member 103 was roughened. Therefore, it can be understood that, even when a material ratio of the roughness profile (Rmr), a ten point average roughness (Rz), and a mean width of the profile elements (RSm) are measured regarding the bonding portion surface 104 of the metal-resin composite structure 106, the same evaluation results as those of the measurement positions shown in FIG. 4 can be obtained.

(Evaluation Method of Bond Strength and Pass-Fail Determination)

Using a tensile strength tester (Model 1323 (manufactured by Aikoh Engineering Co., Ltd.)) to which a jig dedicated to the tensile strength test was installed, the measurement was performed at room temperature (23° C.) under conditions of a distance between chucks of 60 mm and a tensile speed of 10 mm/min. The bond strength (MPa) was obtained by dividing a breaking load (N) by the area of the metal-resin bonded portion.

(Adhesion Test of Metal Member and Coating Film)

Using an applicator, an aluminum plate (dimension: 70×150×1 t) of Alloy No. 5052 defined in JIS H4000 was coated with a water-based coating material such that the thickness of a dried coating film was 40 μm, and the aluminum plate was dried. Next, an end portion and a back surface were also coated with the same water-based coating material. This coated metal member was dried for one day in an atmosphere of 20° C. and 55% RH.

The adhesion of the coated metal member obtained as above was measured according to JIS K 5600-5-6 (cross-cut method). Swelling was evaluated for adhesion based on the following criteria.

[Evaluation of Adhesion of Coating Film]

0: The cut edge was completely smooth, and there was no peeling in any lattice cell.

1: The coating film at the intersection of cuts. The cross-cut portion affected did not clearly exceed 5%.

2: A small amount of peeling of the coating film was observed along the cut edge and/or the intersection point of cuts. The cross-cut portion affected was greater than 5% but did not exceed 15%.

3: A large amount of peeling of the coating film was observed partially and completely along the edge of cuts, and/or various parts of the lattice cell were partially or completely peeled. The cross-cut portion affected was greater than 15% but did not exceed 35%.

4: A large amount of peeling of the coating film was observed partially and completely along the edge of cuts, and/or several parts of the lattice cell were partially or completely peeled. The cross-cut portion affected was greater than 35% but did not exceed 65%.

5: The degree of peeling was greater than Grade 4.

(Surface-Roughening A of Metal Member)

Preparation Example 1A (Surface-Roughening Using Acidic Etchant 1A)

An aluminum plate (thickness: 1.6 mm) of Alloy No. 5052 defined in JIS H4000 was cut into a length of 45 mm and a width of 18 mm. This aluminum plate was etched by being dipped in an acidic etchant 1A (30° C.) having a composition shown in Table 1A for 40 seconds and being shaken. Next, the aluminum plate was washed with flowing water by ultrasonic cleaning (in water, 1 minute) and then was dried. As a result, a surface-treated metal member was obtained.

Figure 5:
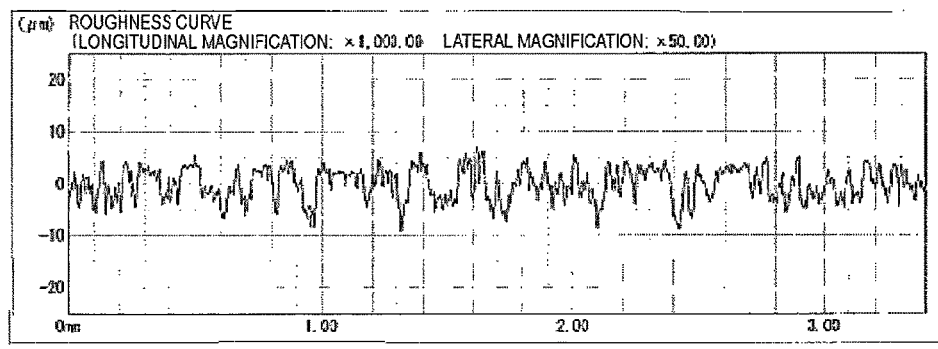
FIG. 5 is a diagram showing a surface roughness curve of a surface of an aluminum plate obtained in Preparation Example 1A.

The surface roughness of the obtained surface-treated metal member was measured using a surface roughness measuring device "SURFCOM 1400D (manufactured by Tokyo Seimitsu Co., Ltd.)". In addition, regarding six linear portions, material ratio of the roughness profile (Rmr) at cutting levels of 10%, 20%, 30%, 40%, 50%, 60%, 70%, and 80%, ten point average roughnesses (Rz) and mean width of the profile elements (RSm) were obtained. Among these, Table 2A shows: Rmr (20%) values at a cutting level of 20%; the number of linear portions in which the Rmr (20%) is lower than or equal to 30%; Rmr (40%) values at a cutting level of 40%; the number of linear portions in which the Rmr (40%) is lower than or equal to 60%; Rz values and mean width of the profile elements (RSm) of the six linear portions; and an etching ratio obtained from mass ratios of the metal member before and after etching. In addition, FIG. 5 shows a surface roughness curve obtained from the above measurement.

Figure 6:
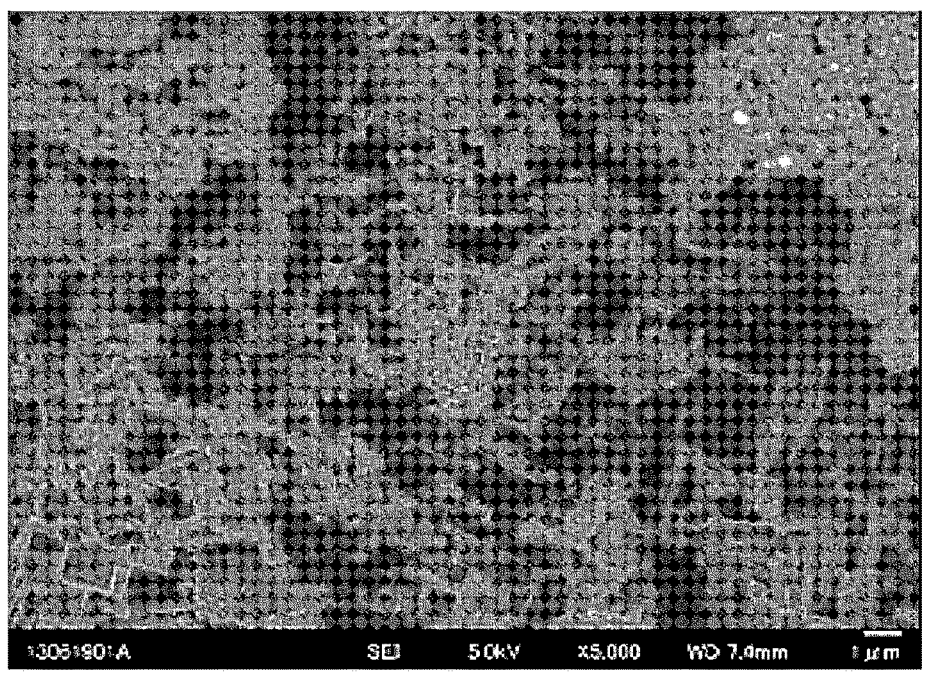
FIG. 6 is an electron micrograph showing an enlarged view of the surface of the aluminum plate obtained in Preparation Example 1A.

The surface of the surface-treated metal member was observed using a scanning electron microscope (manufactured by JEOL Ltd., Model No. JSM-6701F) at a magnification of 5000 times. FIG. 6 shows a micrograph.

Preparation Example 2A (Surface-Roughening Using Acidic Etchant 2A)

A surface-treated metal member was obtained by performing the same treatment as that of Preparation Example 1A, except that the aluminum plate was etched for 80 seconds using an acidic etchant 2A instead of the acidic etchant 1A shown in Table 1A.

Figure 7:
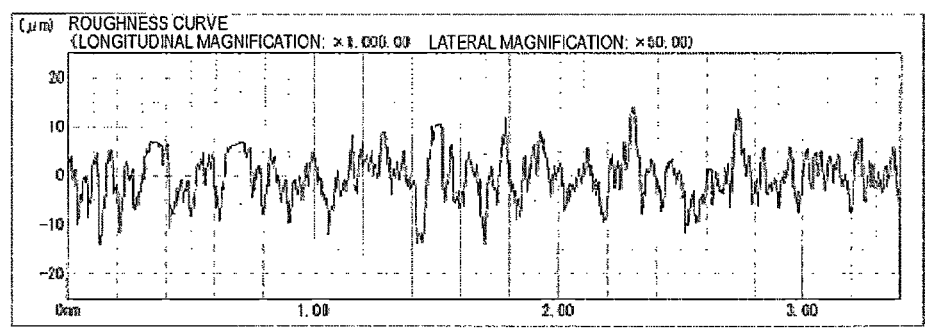
FIG. 7 is a diagram showing a surface roughness curve of a surface of an aluminum plate obtained in Preparation Example 2A.

Table 2A shows Rmr, Rz, RSm, and an etching ratio of the obtained surface-treated metal member. In addition, FIG. 7 shows a surface roughness curve obtained from the above measurement.

Figure 8:
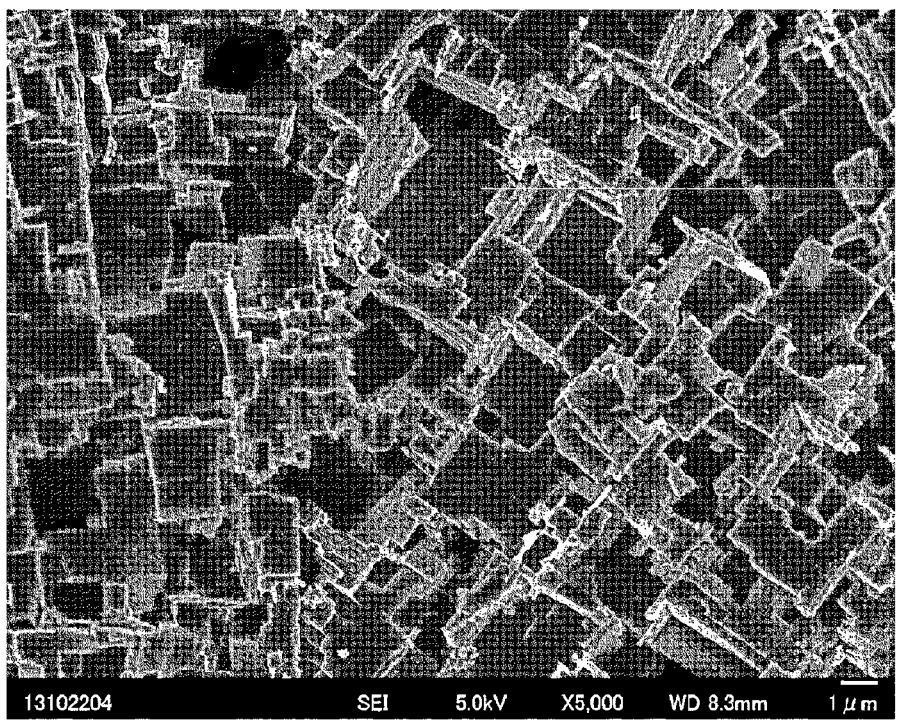
FIG. 8 is an electron micrograph showing an enlarged view of the surface of the aluminum plate obtained in Preparation Example 2A.

The surface of the surface-treated metal member was observed using a scanning electron microscope (manufactured by JEOL Ltd., Model No. JSM-6701F) at a magnification of 5000 times. FIG. 8 shows a micrograph.

Preparation Example 3A (Treatment Using Alkaline Solution after Surface-Roughening Using Acidic Etchant 1A)

An aluminum plate (thickness: 1.6 mm) of Alloy No. 5052 defined in JIS H4000 was cut into a length of 45 mm and a width of 18 mm. This aluminum plate was etched by being dipped in an acidic etchant 1A (30° C.) having a composition shown in Table 1A for 40 seconds and being shaken. Next, the aluminum was washed with flowing water (1 minute). Next, the treated aluminum plate was dipped in an aqueous solution (25° C.) of 5 mass % of sodium hydroxide, was shaken for 30 seconds, and was washed with water. Next, the treated aluminum plate was dipped in an aqueous solution (25° C.) of 35 mass % of nitric acid, was shaken for 30 seconds, was washed (1 minute) with flowing water, and was dried. As a result, a surface-treated metal member was obtained.

Figure 9:
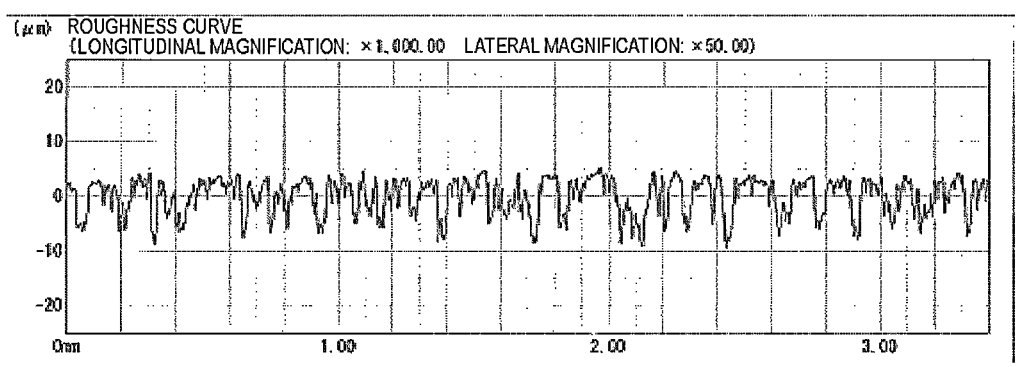
FIG. 9 is a diagram showing a surface roughness curve of a surface of an aluminum plate obtained in Preparation Example 3A.

Table 2A shows Rmr, Rz, RSm, and an etching ratio of the obtained surface-treated metal member. In addition, FIG. 9 shows a surface roughness curve obtained from the above measurement.

Figure 10:
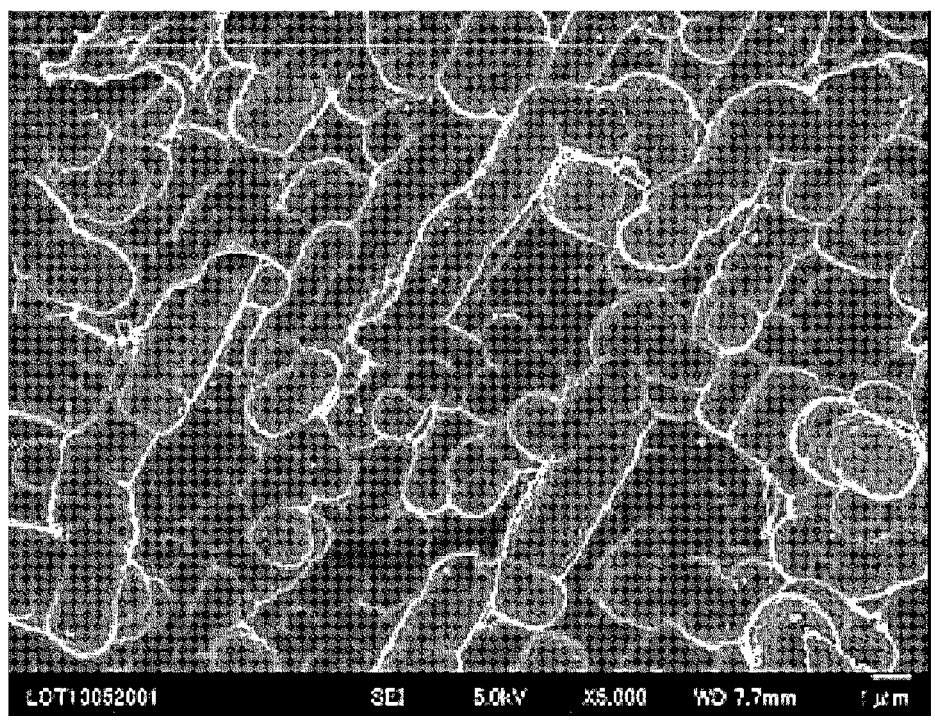
FIG. 10 is an electron micrograph showing an enlarged view of the surface of the aluminum plate obtained in Preparation Example 3A.

The surface of the surface-treated metal member was observed using a scanning electron microscope (manufactured by JEOL Ltd., Model No. JSM-6701F) at a magnification of 5000 times. FIG. 10 shows a micrograph.

Preparation Example 4A (Surface-Roughening Using Acidic Etchant 3A)

A surface-treated metal member was obtained by performing the same treatment as that of Preparation Example 1A, except that the aluminum plate was etched for 160 seconds using an acidic etchant 3A instead of the acidic etchant 1A shown in Table 1A.

Table 2A shows Rmr, Rz, RSm, and an etching ratio of the obtained surface-treated metal member.

Preparation Example 5A (Surface-Roughening Using Acidic Etchant 3A)

A surface-treated metal member was obtained by performing the same treatment as that of Preparation Example 1A, except that the aluminum plate was etched for 80 seconds using an acidic etchant 3A instead of the acidic etchant 1A shown in Table 1A.

Table 2A shows Rmr, Rz, RSm, and an etching ratio of the obtained surface-treated metal member.

Preparation Example 6A (Surface-Roughening Using Acidic Etchant 3A)

A surface-treated metal member was obtained by performing the same treatment as that of Preparation Example 1A, except that the aluminum plate was etched for 40 seconds using an acidic etchant 3A instead of the acidic etchant 1A shown in Table 1A.

Table 2A shows an etching ratio of the obtained surface-treated metal member.

Preparation Example 7A (Surface-Roughening Using Acidic Etchant 4A)

A surface-treated metal member was obtained by performing the same treatment as that of Preparation Example 1A, except that the aluminum plate was etched for 320 seconds using an acidic etchant 4A instead of the acidic etchant 1A shown in Table 1A.

Table 2A shows an etching ratio of the obtained surface-treated metal member.

Preparation Example 8A (Surface-Roughening Using Acidic Etchant 4A)

A surface-treated metal member was obtained by performing the same treatment as that of Preparation Example 1A, except that the aluminum plate was etched for 160 seconds using an acidic etchant 4A instead of the acidic etchant 1A shown in Table 1A.

Table 2A shows an etching ratio of the obtained surface-treated metal member.

Preparation Example 9A (Surface-Roughening Using Acidic Etchant 4A)

A surface-treated metal member was obtained by performing the same treatment as that of Preparation Example 1A, except that the aluminum plate was etched for 80 seconds using an acidic etchant 4A instead of the acidic etchant 1A shown in Table 1A.

Table 2A shows an etching ratio of the obtained surface-treated metal member.

Preparation Example 10A (Surface-Roughening Using Acidic Etchant 4A)

A surface-treated metal member was obtained by performing the same treatment as that of Preparation Example 1A, except that the aluminum plate was etched for 40 seconds using an acidic etchant 4A instead of the acidic etchant 1A shown in Table 1A.

Table 2A shows an etching ratio of the obtained surface-treated metal member.

Example 1A

The small dumbbell-shaped metal insert mold 102 was mounted on J85AD110H manufactured by The Japan Steel Works Ltd., and the aluminum plate (metal member 103) prepared in Preparation Example 1A was installed into the mold 102. Next, as the thermoplastic resin composition (P), glass fiber reinforced polypropylene (V7100 manufactured by Prime Polymer Co., Ltd.; 80 parts by mass of polypropylene (MFR (230° C., load: 2.16 kg): 18 g/10 min) and 20 parts by mass of glass fiber) was injected into the mold 102 under conditions of a cylinder temperature of 250° C., a mold temperature of 120° C., an injection rate of 25 mm/sec, a holding pressure of 80 MPa, and a pressure holding time of 10 seconds. As a result, a metal-resin composite structure 106 was obtained. Table 3A shows the evaluation results of the bond strength.

Example 2A

A metal-resin composite structure 106 was obtained using the same method as that of Example 1A, except that the aluminum plate prepared in Preparation Example 2A was installed instead of the aluminum plate prepared in Preparation Example 1A. Table 3A shows the evaluation results of the bond strength.

Example 3A

A metal-resin composite structure 106 was obtained using the same method as that of Example 1A, except that the aluminum plate prepared in Preparation Example 4A was installed instead of the aluminum plate prepared in Preparation Example 1A. Table 3A shows the evaluation results of the bond strength.

Example 4A

A metal-resin composite structure 106 was obtained using the same method as that of Example 1A, except that the aluminum plate prepared in Preparation Example 5A was installed instead of the aluminum plate prepared in Preparation Example 1A. Table 3A shows the evaluation results of the bond strength.

Example 5A

A metal-resin composite structure 106 was obtained using the same method as that of Example 1A, except that the aluminum plate prepared in Preparation Example 7A was installed instead of the aluminum plate prepared in Preparation Example 1A. Table 3A shows the evaluation results of the bond strength.

Comparative Example 1A

A metal-resin composite structure 106 was obtained using the same method as that of Example 1A, except that the aluminum plate prepared in Preparation Example 3A was installed instead of the aluminum plate prepared in Preparation Example 1A. Table 3A shows the evaluation results of the bond strength.

Comparative Example 2A

A metal-resin composite structure 106 was obtained using the same method as that of Example 1A, except that the aluminum plate prepared in Preparation Example 6A was installed instead of the aluminum plate prepared in Preparation Example 1A. Table 3A shows the evaluation results of the bond strength.

Comparative Example 3A

A metal-resin composite structure 106 was obtained using the same method as that of Example 1A, except that the aluminum plate prepared in Preparation Example 8A was installed instead of the aluminum plate prepared in Preparation Example 1A. Table 3A shows the evaluation results of the bond strength.

Comparative Example 4A

A metal-resin composite structure 106 was obtained using the same method as that of Example 1A, except that the aluminum plate prepared in Preparation Example 9A was installed instead of the aluminum plate prepared in Preparation Example 1A. Table 3A shows the evaluation results of the bond strength.

Comparative Example 5A

A metal-resin composite structure 106 was obtained using the same method as that of Example 1A, except that the aluminum plate prepared in Preparation Example 10A was installed instead of the aluminum plate prepared in Preparation Example 1A. Table 3A shows the evaluation results of the bond strength.

TABLE 1A

| | Mixing Amount | | | |
| --- | --- | --- | --- | --- |
| Component | Acidic Etchant 1A | Acidic Etchant 2A | Acidic Etchant 3A | Acidic Etchant 4A |
| Sulfuric Acid | 8.2 wt % | 8.2 wt % | 4.1 wt % | 2.05 wt % |
| Ferric Chloride | 15.6 wt % ($Fe^{3+}$: 5.4 wt %) | 7.8 wt % ($Fe^{3+}$: 2.7 wt %) | 3.9 wt % ($Fe^{3+}$: 1.35 wt %) | 1.95 wt % ($Fe^{3+}$: 0.68 wt %) |
| Cupric Chloride | 0.4 wt % ($Cu^{2+}$: 0.2 wt %) | 0.4 wt % ($Cu^{2+}$: 0.2 wt %) | 0.2 wt % ($Cu^{2+}$: 0.1 wt %) | 0.1 wt % ($Cu^{2+}$: 0.05 wt %) |
| Manganese Sulfate (Monohydrate) | 0.7 wt % ($Mn^{2+}$: 0.2 wt %) | Not Contained | Not Contained | Not Contained |
| Ion Exchange Water | Balance | Balance | Balance | Balance |

TABLE 2A

| | Etching Process | Dipping Time [sec] of Acidic Etchant A | Rmr (20%) [%] of Six Linear Portions | Number of Linear Portions Satisfying Rmr (20%) ≤ 30% | Rmr (40%) [%] of Six Linear Portions | Number of Linear Portions Satisfying Rmr (40%) ≤ 60% | Rz Rz [μm] of Six Linear Portions | RSm RSm [μm] of Six Linear Portions | Etching Ratio (wt %) |
| --- | --- | --- | --- | --- | --- | --- | --- | --- | --- |
| Preparation Example 1A | Acidic Etchant 1A → Ultrasonic | 40 | 49.6, 25.0, 10.4, 33.5, | 4 | 75.4, 63.3, 42.1, 65.3, | 3 | 11.0, 12.2, 13.8, 11.7, | 73.1, 74.2, 88.1, 93.0, | 1.1 |

TABLE 2A-continued

|  | Etching Process | Dipping Time [sec] of Acidic Etchant A | Rmr (20%) [%] of Six Linear Portions | Number of Linear Portions Satisfying Rmr (20%) ≤ 30% | Rmr (40%) [%] of Six Linear Portions | Number of Linear Portions Satisfying Rmr (40%) ≤ 60% | Rz Rz [μm] of Six Linear Portions | RSm RSm [μm] of Six Linear Portions | Etching Ratio (wt %) |
|---|---|---|---|---|---|---|---|---|---|
| Preparation Example 2A | Cleaning Acidic Etchant 2A → Ultrasonic Cleaning | 80 | 5.7, 16.7, 17.5, 10.3, 13.4, 10.6, 3.8, 7.4 | 6 | 47.6, 50.1, 43.6, 26.1, 48.0, 46.7, 33.5, 34.2 | 6 | 10.8, 11.3, 17.8, 18.1, 19.6, 17.8, 17.2, 18.0 | 92.6, 99.1, 104, 83.0, 85.6, 98.7, 106.6, 103.1 | 2.6 |
| Preparation Example 3A | Acidic Etchant 1A → Aqueous Sodium Hydroxide Solution → Aqueous Nitric Acid Solution → Washing With Water | 40 | 45.2, 48.4, 30.6, 33.7, 44.3, 49.2 | 0 | 78.1, 76.9, 61.5, 70.7, 71.6, 79.4 | 0 | 10.0, 11.3, 11.2, 10.3, 9.7, 9.2 | 58.7, 85.1, 77.5, 78.9, 81.1, 104.8 | 1.1 |
| Preparation Example 4A | Acidic Etchant 3A → Ultrasonic Cleaning | 160 | 73.6, 58.7, 6.4, 42.2, 48.5, 6.7 | 2 | ND | — | 8.3, 10.8, 9.2, 6.5, 7.2, 8.8 | 155.3, 186.0, 171.3, 180.8, 158.2, 168.7 | 1.3 |
| Preparation Example 5A | Acidic Etchant 3A → Ultrasonic Cleaning | 80 | 53.7, 1.0, 80.4, 14.3, 26.7, 26.9 | 4 | ND | — | 2.8, 3.2, 3.3, 2.2, 2.1, 2.1 | 71.0, 73.7, 92.5, 89.1, 70.6, 66.8 | 0.4 |
| Preparation Example 6A | Acidic Etchant 3A → Ultrasonic Cleaning | 40 | ND | — | ND | — | ND | ND | 0.2 |
| Preparation Example 7A | Acidic Etchant 4A → Ultrasonic Cleaning | 320 | ND | — | ND | — | ND | ND | 0.6 |
| Preparation Example 8A | Acidic Etchant 4A → Ultrasonic Cleaning | 160 | ND | — | ND | — | ND | ND | 0.3 |
| Preparation Example 9A | Acidic Etchant 4A → Ultrasonic Cleaning | 80 | ND | — | ND | — | ND | ND | 0.1 |
| Preparation Example 10A | Acidic Etchant 4A → Ultrasonic Cleaning | 40 | ND | — | ND | — | ND | ND | 0.1 |

In the above table, ND represents "Not Measured".

TABLE 3A

|  | Major Component | Product Name | MFR [g/10 min] | Etching Method | Bond Strength [MPa] |
|---|---|---|---|---|---|
| Example 1A | Polypropylene Resin | V-7100 (Manufactured by Prime Polymer Co., Ltd.) | 18 | Preparation Example 1A | 16 |
| Example 2A | Polypropylene Resin | V-7100 (Manufactured by Prime Polymer Co., Ltd.) | 18 | Preparation Example 2A | 24 |
| Example 3A | Polypropylene Resin | V-7100 (Manufactured by Prime Polymer Co., Ltd.) | 18 | Preparation Example 4A | 20 |
| Example 4A | Polypropylene Resin | V-7100 (Manufactured by Prime Polymer Co., Ltd.) | 18 | Preparation Example 5A | 11 |
| Example 5A | Polypropylene Resin | V-7100 (Manufactured by Prime Polymer Co., Ltd.) | 18 | Preparation Example 7A | 14 |
| Comparative Example 1A | Polypropylene Resin | V-7100 (Manufactured by Prime Polymer Co., Ltd.) | 18 | Preparation Example 3A | 5 |
| Comparative Example 2A | Polypropylene Resin | V-7100 (Manufactured by Prime Polymer Co., Ltd.) | 18 | Preparation Example 6A | 5 |
| Comparative Example 3A | Polypropylene Resin | V-7100 (Manufactured by Prime Polymer Co., Ltd.) | 18 | Preparation Example 8A | 7 |

TABLE 3A-continued

|  | Major Component | Product Name | MFR [g/10 min] | Etching Method | Bond Strength [MPa] |
|---|---|---|---|---|---|
| Comparative Example 4A | Polypropylene Resin | V-7100 (Manufactured by Prime Polymer Co., Ltd.) | 18 | Preparation Example 9A | 3 |
| Comparative Example 5A | Polypropylene Resin | V-7100 (Manufactured by Prime Polymer Co., Ltd.) | 18 | Preparation Example 10A | 0 |

In Example 1A, as shown in FIG. 5, a concavo-convex portion having a sharp angle was formed on the surface of the metal member treated in Preparation Example 1A, and it is considered that, by the resin member 105 being inserted into the concavo-convex portion, the obtained metal-resin composite structure 106 obtained a high bond strength.

In Example 2A, as shown in FIG. 7, a concavo-convex portion having a sharper angle than that of FIG. 5 was formed on the surface of the metal member treated in Preparation Example 2A, and it is considered that, by the resin member being inserted into the concavo-convex portion, the obtained metal-resin composite structure 106 obtained a high bond strength.

On the other hand, in Comparative Example 1A, as shown in FIG. 9, a concavo-convex portion having a sufficient size was not formed on the surface of the metal member treated in Preparation Example 3A, and the obtained metal-resin composite structure 106 obtained a low bond strength.

(Surface-Roughening B of Metal Member)

Preparation Example 1B (Surface-Roughening Using Acidic Etchant B)

An aluminum plate (thickness: 1.6 mm) of Alloy No. 5052 defined in JIS H4000 was cut into a length of 45 mm and a width of 18 mm. This aluminum plate was etched in an etching amount shown in Table 3B by being dipped in an acidic etchant B (30° C.) having a composition shown in Table 1B and being shaken. Next, the aluminum plate was washed with flowing water (1 minute) and then was dried. As a result, a surface-treated metal member was obtained. The etching amount was calculated from a mass difference of the aluminum component before and after the etching, the specific gravity of aluminum, and the surface area of the aluminum plate, and was controlled by the etching time. The same shall be applied to the "etching amount" described below.

Figure 12:
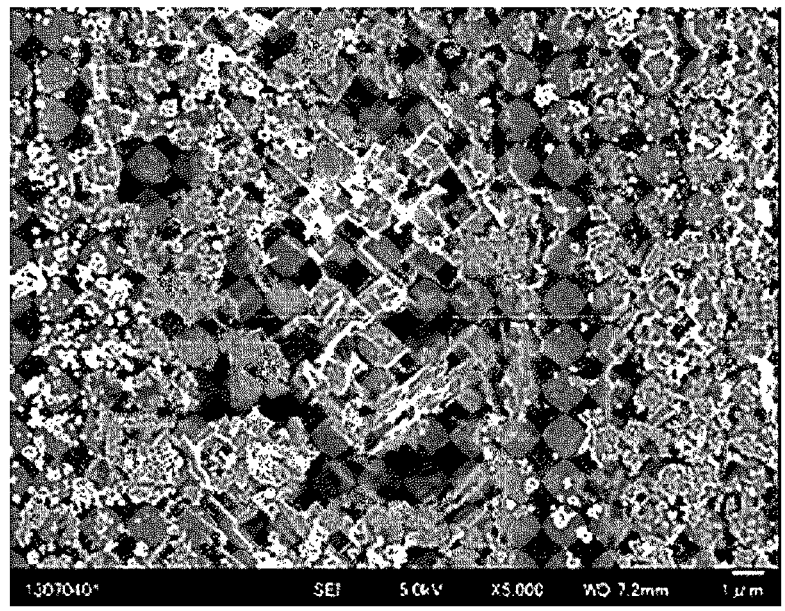
FIG. 12 is an electron micrograph showing an enlarged view of a surface of an aluminum plate obtained in Preparation Example 1B.

The surface of the surface-treated metal member was observed using a scanning electron microscope (manufactured by JEOL Ltd., Model No. JSM-6701F) at a magnification of 5000 times. FIG. 12 shows a micrograph.

Preparation Example 2B (Ultrasonic Cleaning after Surface-Roughening Using Acidic Etchant B)

A surface-treated metal member was obtained by performing the same treatment as that of Preparation Example 1B, except that the aluminum plate was washed by ultrasonic cleaning (in water, 1 minute) after being etched using the acidic etchant B.

Figure 13:
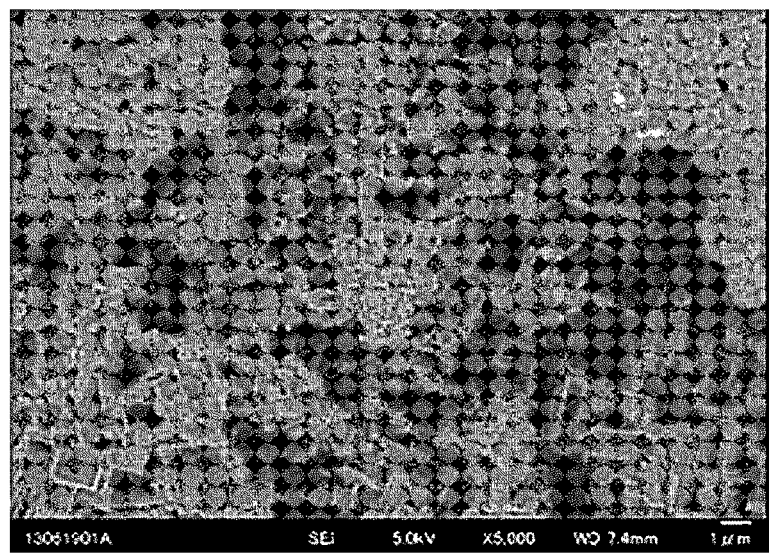
FIG. 13 is an electron micrograph showing an enlarged view of a surface of an aluminum plate obtained in Preparation Example 2B.

The surface of the surface-treated metal member was observed using a scanning electron microscope (manufactured by JEOL Ltd., Model No. JSM-6701F) at a magnification of 5000 times. FIG. 13 shows a micrograph.

Preparation Example 3B (Surface-Roughening Using Acidic Etchant B after Treatment Using Alkaline Etchant)

An aluminum plate (thickness: 1.6 mm) of Alloy No. 5052 defined in JIS H4000 was cut into a length of 45 mm and a width of 18 mm. This aluminum plate was dipped in an alkaline etchant (35° C.) having a composition shown in Table 2B, was shaken for 1 minute, and was washed (1 minute) with flowing water. Next, this aluminum plate was etched in an etching amount shown in Table 3B by being dipped in an acidic etchant B (30° C.) having a composition shown in Table 1B and being shaken. Next, the aluminum plate was washed with flowing water (1 minute) and then was dried. As a result, a surface-treated metal member was obtained. The etching amount shown in Table 3B is the sum of the etching amount by the alkaline etchant and the etching amount by the acidic etchant B.

Preparation Example 4B (Surface-Roughening Using Alkaline Etchant)

An aluminum plate (thickness: 1.6 mm) of Alloy No. 5052 defined in JIS H4000 was cut into a length of 45 mm and a width of 18 mm. This aluminum plate was etched in an etching amount shown in Table 3B by being dipped in an alkaline etchant (35° C.) having a composition shown in Table 2B and being shaken. After being washed (1 minute) with flowing water, the treated aluminum plate was dipped in an aqueous solution (25° C.) of 15 mass % of nitric acid, was shaken for 60 seconds, was washed (1 minute) with flowing water, and was dried. As a result, a surface-treated metal member was obtained.

Figure 14:
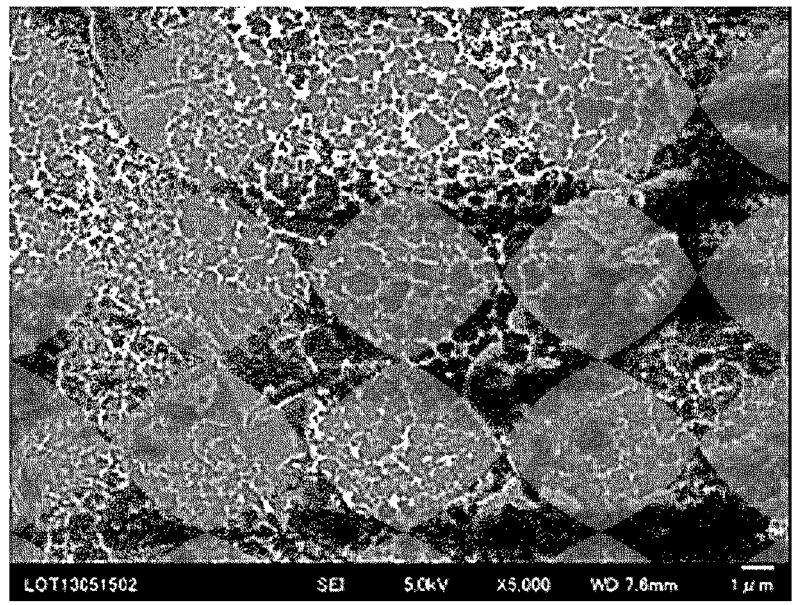
FIG. 14 is an electron micrograph showing an enlarged view of a surface of an aluminum plate obtained in Preparation Example 4B.

The surface of the surface-treated metal member was observed using a scanning electron microscope (manufactured by JEOL Ltd., Model No. JSM-6701F) at a magnification of 5000 times. FIG. 14 shows a micrograph.

Preparation Example 5B (Surface-Roughening Using Alkaline Etchant after Treatment Using Acidic Etchant B)

An aluminum plate (thickness: 1.6 mm) of Alloy No. 5052 defined in JIS H4000 was cut into a length of 45 mm and a width of 18 mm. This aluminum plate was dipped in the acidic etchant B (30° C.) having a composition shown in Table 1B, was shaken for 1 minute, and was washed (1 minute) with flowing water. Next, this aluminum plate was etched in an etching amount shown in Table 3B by being dipped in an alkaline etchant (35° C.) having a composition shown in Table 2B and being shaken. Next, the aluminum plate was washed with flowing water (1 minute) and then was dried. As a result, a surface-treated metal member was obtained. The etching amount shown in Table 3B is the sum of the etching amount by the acidic etchant B and the etching amount by the alkaline etchant.

Preparation Example 6B (Treatment Using Alkaline Solution after Surface-Roughening Using Acidic Etchant B)

An aluminum plate (thickness: 2 mm) of Alloy No. 5052 defined in JIS H4000 was cut into a length of 110 mm and a width of 25 mm. This aluminum plate was etched in an etching amount shown in Table 3B by being dipped in an acidic etchant B (30° C.) having a composition shown in Table 1B and being shaken. Next, the aluminum plate was washed (1 minute) with flowing water. Next, the treated aluminum plate was dipped in an aqueous solution (25° C.) of 5 mass % of sodium hydroxide, was shaken for 30 seconds, and was washed with water. Next, the treated aluminum plate was dipped in an aqueous solution (25° C.) of 35 mass % of nitric acid, was shaken for 30 seconds, was washed (1 minute) with flowing water, and was dried. As a result, a surface-treated metal member was obtained.

Figure 15:
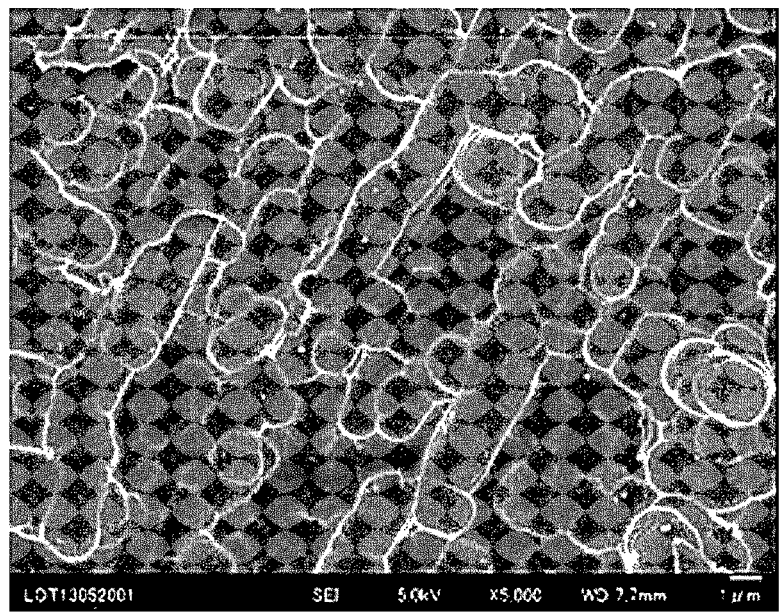
FIG. 15 is an electron micrograph showing an enlarged view of a surface of an aluminum plate obtained in Preparation Example 6B.

The surface of the surface-treated metal member was observed using a scanning electron microscope (manufactured by JEOL Ltd., Model No. JSM-6701F) at a magnification of 5000 times. FIG. 15 shows a micrograph.

Example 1B

The small dumbbell-shaped metal insert mold 102 was mounted on J85AD110H manufactured by The Japan Steel Works Ltd., and the aluminum plate (metal member 103) prepared in Preparation Example 1B was installed into the mold 102. Next, as the thermoplastic resin composition (P), glass fiber reinforced polypropylene (V7100 manufactured by Prime Polymer Co., Ltd.; 80 parts by mass of polypropylene (MFR (230° C., load: 2.16 kg): 18 g/10 min) and 20 parts by mass of glass fiber) was injected into the mold 102 under conditions of a cylinder temperature of 250° C., a mold temperature of 120° C., an injection rate of 25 mm/sec, a holding pressure of 80 MPa, and a pressure holding time of 10 seconds. As a result, a metal-resin composite structure 106 was obtained. Table 4B shows the evaluation results of the bond strength.

Example 2B

A metal-resin composite structure 106 was obtained using the same method as that of Example 1B, except that the aluminum plate prepared in Preparation Example 2B was installed instead of the aluminum plate prepared in Preparation Example 1B. Table 4B shows the evaluation results of the bond strength.

Example 3B

A metal-resin composite structure 106 was obtained using the same method as that of Example 1B, except that, as the thermoplastic resin composition (P), glass fiber reinforced polypropylene (L-2040P manufactured by Prime Polymer Co., Ltd.; 80 parts by mass of polypropylene (MFR (230° C., load: 2.16 kg): 20 g/10 min) and 20 parts by mass of glass fiber) was used instead of the glass fiber reinforced polypropylene (V7100 manufactured by Prime Polymer Co., Ltd.; 80 parts by mass of polypropylene (MFR (230° C., load: 2.16 kg): 18 g/10 min) and 20 parts by mass of glass fiber). Table 4B shows the evaluation results of the bond strength.

Example 4B

A metal-resin composite structure 106 was obtained using the same method as that of Example 1B, except that, as the thermoplastic resin composition (P), homopolypropylene (J105G manufactured by Prime Polymer Co., Ltd., (MFR (230° C., load: 2.16 kg): 9 g/10 min)) was used instead of the glass fiber reinforced polypropylene (V7100 manufactured by Prime Polymer Co., Ltd.; 80 parts by mass of polypropylene (MFR (230° C., load: 2.16 kg): 18 g/10 min) and 20 parts by mass of glass fiber). Table 4B shows the evaluation results of the bond strength.

Example 5B

A metal-resin composite structure 106 was obtained using the same method as that of Example 1B, except that the aluminum plate prepared in Preparation Example 3B was installed instead of the aluminum plate prepared in Preparation Example 1B. Table 4B shows the evaluation results of the bond strength.

Comparative Example 1B

A metal-resin composite structure 106 was obtained using the same method as that of Example 1B, except that the aluminum plate prepared in Preparation Example 4B was installed instead of the aluminum plate prepared in Preparation Example 1B. Table 4B shows the evaluation results of the bond strength.

Comparative Example 2B

A metal-resin composite structure 106 was obtained using the same method as that of Example 1B, except that the aluminum plate prepared in Preparation Example 5B was installed instead of the aluminum plate prepared in Preparation Example 1B. Table 4B shows the evaluation results of the bond strength.

Comparative Example 3B

A metal-resin composite structure 106 was obtained using the same method as that of Example 1B, except that the aluminum plate prepared in Preparation Example 6B was installed instead of the aluminum plate prepared in Preparation Example 1B. Table 4B shows the evaluation results of the bond strength.

TABLE 1B

| Acidic Etchant B | |
|---|---|
| Component | Mixing Amount |
| Sulfuric Acid | 8.2 wt % |
| Ferric Chloride | 15.6 wt % (Ferric Ions: 5.37 wt %) |
| Cupric Chloride | 0.4 wt % (Cupric Ions: 0.19 wt %) |
| Manganese Sulfate (Monohydrate) | 0.7 wt % (Manganese Ions: 0.23 wt %) |
| Ion Exchange Water | Balance |

TABLE 2B

| Alkaline Etchant | |
|---|---|
| Component | Mixing Amount |
| Sodium Hydroxide | 16.8 wt % (Hydroxide Ions: 7.14 wt %) |
| Zinc Nitrate | 12.5 wt % (Zinc Ions: 4.32 wt %, Nitrate Ions: 8.18 wt %) |
| Sodium Thiosulfate | 1.0 wt % (Thiosulfate Ions: 0.71 wt %) |
| Ion Exchange Water | Balance |

TABLE 3B

| | Etching Process | Etching Amount [μm] |
|---|---|---|
| Preparation Example 1B | Acidic Etchant B → Washing with Water | 20 |
| Preparation Example 2B | Acidic Etchant B → Ultrasonic Cleaning | 20 |
| Preparation Example 3B | Alkaline Etchant → Acidic Etchant B → Washing with Water | 15 |
| Preparation Example 4B | Alkaline Etchant → Washing with Water | 4 |
| Preparation Example 5B | Acidic Etchant B → Alkaline Etchant → Washing with Water | 20 |
| Preparation Example 6B | Acidic Etchant B → Aqueous Sodium Hydroxide Solution → Aqueous Nitric Acid Solution → Washing with Water | 20 |

TABLE 4B

| | Major Component | Product Name | MFR [g/10 min] | Etching Method | Bond Strength [MPa] |
|---|---|---|---|---|---|
| Example 1B | Polypropylene Resin | V-7100 (Manufactured by Prime Polymer Co., Ltd.) | 18 | Preparation Example 1B | 12 |
| Example 2B | Polypropylene Resin | V-7100 (Manufactured by Prime Polymer Co., Ltd.) | 18 | Preparation Example 2B | 16 |
| Example 3B | Polypropylene Resin | L-2040P (Manufactured by Prime Polymer Co., Ltd.) | 20 | Preparation Example 1B | 13 |
| Example 4B | Polypropylene Resin | J105G (Manufactured by Prime Polymer Co., Ltd.) | 9 | Preparation Example 1B | 11 |
| Example 5B | Polypropylene Resin | V-7100 (Manufactured by Prime Polymer Co., Ltd.) | 18 | Preparation Example 3B | 12 |
| Comparative Example 1B | Polypropylene Resin | V-7100 (Manufactured by Prime Polymer Co., Ltd.) | 18 | Preparation Example 4B | 1.8 |
| Comparative Example 2B | Polypropylene Resin | V-7100 (Manufactured by Prime Polymer Co., Ltd.) | 18 | Preparation Example 5B | 2.2 |
| Comparative Example 3B | Polypropylene Resin | V-7100 (Manufactured by Prime Polymer Co., Ltd.) | 18 | Preparation Example 6B | 0 |

In Example 1B, as shown in FIG. 12, a concavo-convex portion having a sharp angle was formed on the surface of the metal member 103 treated in Preparation Example 1B, and it is considered that, by the resin member 105 being inserted into the concavo-convex portion, the obtained metal-resin composite structure 106 obtained a high bond strength.

In Example 2B, the metal member 103 treated in Preparation Example 1B was further washed by ultrasonic cleaning (in water, one minute) in Preparation Example 2B. Due to the above treatment, smut and the like formed on the metal surface can be removed. Therefore, as shown in FIG. 13, a concavo-convex portion having a sharp angle was formed on the surface of the metal member 103, and it is considered that, by the resin member 105 being inserted into the concavo-convex portion, the obtained metal-resin composite structure 106 obtained a high bond strength.

In Example 3B, the glass fiber reinforced polypropylene (L-2040P) having a relatively long glass fiber length was used instead of the glass fiber reinforced polypropylene (V-7100) used in Example 1B, but a high bond strength was obtained as in the case of Example 1B.

In addition, in Example 4B, the homopolypropylene (J105G) was used instead of the glass fiber reinforced polypropylene (V-7100) used in Example 1B, but a high bond strength was obtained as in the case of Example 1B.

In Example 5B, the same method as that of Example 1B was performed using the metal member 103 obtained in Preparation Example 3B which was surface-roughened using the acidic etchant B after being treated using the alkaline etchant, but the obtained metal-resin composite structure 106 obtained as a high bond strength as the bond strength in Example 1B.

On the other hand, in Comparative Example 1B, as shown in FIG. 14, a concavo-convex portion having a sufficient size was not formed on the surface of the metal member treated in Preparation Example 4B, and the obtained metal-resin composite structure 106 obtained a low bond strength.

In Comparative Example 2B, the metal member, which was treated with the alkaline etchant after being etched using the acidic etchant B in Preparation Example 5B, was used.

In Comparative Example 3B, the metal member, which was treated using the aqueous sodium hydroxide solution and the aqueous nitric acid solution after being etched using the acidic etchant B in Preparation Example 6B, was used. It is assumed that, as shown in FIG. 12, a concavo-convex portion having a sharp angle was formed on the surface of the metal member due to the treatment using the acidic etchant B. However, it is considered that the concavo-convex portion deteriorated due to the treatment using the alkaline etchant or sodium hydroxide, and a low bond strength was obtained. FIG. 15 shows the shape of the metal surface of Comparative Example 3B which was treated in Preparation Example 6B.

Example 1C

The small dumbbell-shaped metal insert mold 102 was mounted on J85AD110H manufactured by The Japan Steel Works Ltd., and the aluminum plate (metal member 103) prepared in Preparation Example 1B was installed into the mold 102. Next, as the thermoplastic resin composition (P), a polyether imide resin (1100F manufactured by Saudi Basic Industries Corporation, Tg=217° C.) was injected into the mold 102 under conditions of a cylinder temperature of 400° C., a mold temperature of 170° C., an injection rate of 25 mm/sec, a holding pressure of 180 MPa, and a pressure holding time of 10 seconds. As a result, a metal-resin composite structure 106 was obtained. Table 1C shows the evaluation results of the bond strength.

Example 2C

A metal-resin composite structure 106 was obtained using the same method as that of Example 1C, except that the aluminum plate prepared in Preparation Example 2B was installed instead of the aluminum plate prepared in Preparation Example 1B. Table 1C shows the evaluation results of the bond strength.

Example 3C

A metal-resin composite structure 106 was obtained using the same method as that of Example 1C, except that, as the thermoplastic resin composition (P), a glass fiber reinforced polyimide resin (JGH3030 manufactured by Mitsui Chemicals Inc.; 70 parts by weight of polyimide resin having Tg of 250° C. and 30 parts by mass of glass fiber) was used instead of the polyether imide resin (1100F manufactured by Saudi Basic Industries Corporation). Table 1C shows the evaluation results of the bond strength.

Example 4C

A metal-resin composite structure 106 was obtained using the same method as that of Example 1C, except that, as the thermoplastic resin composition (P), a polyether sulfone resin (4101GL20 manufactured by Sumitomo Chemical Co., Ltd., Tg=225° C.) was used instead of the polyether imide resin (1100F manufactured by Saudi Basic Industries Corporation). Table 1C shows the evaluation results of the bond strength.

Example 5C

A metal-resin composite structure 106 was obtained using the same method as that of Example 1C, except that, as the thermoplastic resin composition (P), a glass fiber reinforced polycarbonate resin (GN3630H manufactured by Teijin Ltd., Tg of a resin portion=150° C.) was used instead of the polyether imide resin (1100F manufactured by Saudi Basic Industries Corporation). Table 1C shows the evaluation results of the bond strength.

Example 6C

A metal-resin composite structure 106 was obtained using the same method as that of Example 1C, except that the aluminum plate prepared in Preparation Example 3B was installed instead of the aluminum plate prepared in Preparation Example 1B. Table 1C shows the evaluation results of the bond strength.

Comparative Example 1C

A metal-resin composite structure 106 was obtained using the same method as that of Example 1C, except that the aluminum prepared in Preparation Example 4B was installed instead of the aluminum plate prepared in Preparation Example 1B. Table 1C shows the evaluation results of the bond strength.

Comparative Example 2C

A metal-resin composite structure was obtained using the same method as that of Example 1C, except that the aluminum plate prepared in Preparation Example 5B was installed instead of the aluminum plate prepared in Preparation Example 1B. Table 1C shows the evaluation results of the bond strength.

Comparative Example 3C

A metal-resin composite structure 106 was obtained using the same method as that of Example 1C, except that the aluminum plate prepared in Preparation Example 6B was installed instead of the aluminum plate prepared in Preparation Example 1B. Table 1C shows the evaluation results of the bond strength.

TABLE 1C

|  | Major Component | Product Name | Etching Method | Bond Strength [MPa] |
| --- | --- | --- | --- | --- |
| Example 1C | Polyether Imide Resin | 1100F (Manufactured by Saudi Basic Industries Corporation) | Preparation Example 1B | 11 |
| Example 2C | Polyether Imide Resin | 1100F (Manufactured by Saudi Basic Industries Corporation) | Preparation Example 2B | 10 |

TABLE 1C-continued

| | Major Component | Product Name | Etching Method | Bond Strength [MPa] |
|---|---|---|---|---|
| Example 3C | Glass Fiber Reinforced Polyimide Resin | JGH3030 (Manufactured by Mitsui Chemicals Inc.) | Preparation Example 1B | 17 |
| Example 4C | Polyether Sulfone Resin | 4101GL20 (Manufactured by Sumitomo Chemical Co., Ltd.) | Preparation Example 1B | 12 |
| Example 5C | Glass Fiber Reinforced Polycarbonate Resin | GN3630H (Manufactured by Teijin Ltd.) | Preparation Example 1B | 15 |
| Example 6C | Polyether Imide Resin | 1100F (Manufactured by Saudi Basic Industries Corporation) | Preparation Example 3B | 10 |
| Comparative Example 1C | Polyether Imide Resin | 1100F (Manufactured by Saudi Basic Industries Corporation) | Preparation Example 4B | 2 |
| Comparative Example 2C | Polyether Imide Resin | 1100F (Manufactured by Saudi Basic Industries Corporation) | Preparation Example 5B | 2 |
| Comparative Example 3C | Polyether Imide Resin | 1100F (Manufactured by Saudi Basic Industries Corporation) | Preparation Example 6B | 1 |

In Example 1C, as shown in FIG. 12, a concavo-convex portion having a sharp angle was formed on the surface of the metal member 103 treated in Preparation Example 1B, and it is considered that, by the resin member 105 being inserted into the concavo-convex portion, the obtained metal-resin composite structure 106 obtained a high bond strength.

In Example 2C, the metal member treated in Preparation Example 1B was further washed by ultrasonic cleaning (in water, one minute) in Preparation Example 2B. Due to the above treatment, smut and the like formed on the metal surface can be removed. Therefore, as shown in FIG. 13, a concavo-convex portion having a sharp angle was formed on the surface of the metal member 103, and it is considered that, by the resin member 105 being inserted into the concavo-convex portion, the obtained metal-resin composite structure 106 exhibited a high bond strength.

In Example 3C, the glass fiber reinforced polyimide resin (JGH3030) was used instead of the polyether imide resin (1100F) used in Example 1C, but a high bond strength was obtained as in the case of Example 1C.

In addition, in Example 4C, the polyether sulfone resin (4101GL20) was used instead of the polyether imide resin (1100F) used in Example 1C, but a high bond strength was obtained as in the case of Example 1C.

In addition, in Example 5C, the glass fiber reinforced polycarbonate resin (GN3630H) was used instead of the polyether imide resin (1100F) used in Example 1C, but a high bond strength was obtained as in the case of Example 1C.

In Example 6C, the same method as that of Example 1C was performed using the metal member 103 obtained in Preparation Example 3B which was surface-roughened using the acidic etchant B after being treated using the alkaline etchant, but the obtained metal-resin composite structure 106 obtained as a high bond strength as the bond strength in Example 1C.

On the other hand, in Comparative Example 1C, as shown in FIG. 14, a concavo-convex portion having a sufficient size was not formed on the surface of the metal member 103 treated in Preparation Example 4B, and the obtained metal-resin composite structure 106 obtained a low bond strength.

In Comparative Example 2C, the metal member, which was treated with the alkaline etchant after being etched using the acidic etchant B in Preparation Example 5B, was used. In Comparative Example 3C, the metal member, which was treated using the aqueous sodium hydroxide solution and the aqueous nitric acid solution after being etched using the acidic etchant B in Preparation Example 6B, was used. It is assumed that, as shown in FIG. 12, a concavo-convex portion having a sharp angle was formed on the surface of the metal member due to the treatment using the acidic etchant B. However, it is considered that the concavo-convex portion deteriorated due to the treatment using the alkaline etchant or sodium hydroxide, and a low bond strength was obtained. FIG. 15 shows the shape of the metal surface of Comparative Example 3C which was treated in Preparation Example 6B.

(Surface-Roughening D of Metal Member)

Preparation Example 1D (Surface-Roughening Using Acidic Etchant B)

An aluminum plate (thickness: 1 mm) of Alloy No. 5052 defined in JIS H4000 was cut into a length of 150 mm and a width of 75 mm. This aluminum plate was etched in an etching amount shown in Table 1D by being dipped in an acidic etchant B (30° C.) having a composition shown in Table 1B and being shaken. Next, the aluminum plate was washed with flowing water (1 minute) and then was dried. As a result, a surface-treated metal member was obtained. The etching amount was calculated from a mass difference of the aluminum component before and after the etching, the specific gravity of aluminum, and the surface area of the aluminum plate, and was controlled by the etching time. The same shall be applied to the "etching amount" described below.

Preparation Example 2D (Ultrasonic Cleaning after Surface-Roughening Using Acidic Etchant B)

A surface-treated metal member was obtained by performing the same treatment as that of Preparation Example 1D, except that the aluminum plate was washed by ultrasonic cleaning (in water, 1 minute) after being etched using the acidic etchant B.

Preparation Example 3D (Surface-Roughening Using Acidic Etchant B after Treatment Using Alkaline Etchant)

An aluminum plate (thickness: 1 mm) of Alloy No. 5052 defined in JIS H4000 was cut into a length of 150 mm and a width of 75 mm. This aluminum plate was dipped in an alkaline etchant (35° C.) having a composition shown in Table 2B, was shaken for 1 minute, and was washed (1 minute) with flowing water. Next, this aluminum plate was etched in an etching amount shown in Table 1D by being dipped in an acidic etchant B (30° C.) having a composition shown in Table 1B and being shaken. Next, the aluminum plate was washed with flowing water (1 minute) and then was dried. As a result, a surface-treated metal member was obtained. The etching amount shown in Table 1D is the sum of the etching amount by the alkaline etchant and the etching amount by the acidic etchant B.

Preparation Example 4D (Surface-Roughening Using Alkaline Etchant)

An aluminum plate (thickness: 1 mm) of Alloy No. 5052 defined in JIS H4000 was cut into a length of 150 mm and a width of 75 mm. This aluminum plate was etched in an etching amount shown in Table 1D by being dipped in an alkaline etchant (35° C.) having a composition shown in Table 2B and being shaken. After being washed (1 minute) with flowing water, the treated aluminum plate was dipped in an aqueous solution (25° C.) of 15 mass % of nitric acid, was shaken for 60 seconds, was washed (1 minute) with flowing water, and was dried. As a result, a surface-treated metal member was obtained.

Preparation Example 5D (Surface-Roughening Using Alkaline Etchant after Treatment Using Acidic Etchant B)

An aluminum plate (thickness: 1 mm) of Alloy No. 5052 defined in JIS H4000 was cut into a length of 150 mm and a width of 75 mm. This aluminum plate was dipped in the acidic etchant B (30° C.) having a composition shown in Table 1B, was shaken for 1 minute, and was washed (1 minute) with flowing water. Next, this aluminum plate was etched in an etching amount shown in Table 1D by being dipped in an alkaline etchant (35° C.) having a composition shown in Table 2B and being shaken. Next, the aluminum plate was washed with flowing water (1 minute) and then was dried. As a result, a surface-treated metal member was obtained. The etching amount shown in Table 1D is the sum of the etching amount by the acidic etchant B and the etching amount by the alkaline etchant.

Preparation Example 6D (Treatment Using Alkaline Solution after Surface-Roughening Using Acidic Etchant B)

An aluminum plate (thickness: 1 mm) of Alloy No. 5052 defined in JIS H4000 was cut into a length of 150 mm and a width of 75 mm.

This aluminum plate was etched in an etching amount shown in Table 1D by being dipped in an acidic etchant B (30° C.) having a composition shown in Table 1B and being shaken. Next, the aluminum plate was washed (1 minute) with flowing water. Next, the treated aluminum plate was dipped in an aqueous solution (25° C.) of 5 mass % of sodium hydroxide, was shaken for 30 seconds, and was washed with water. Next, the treated aluminum plate was dipped in an aqueous solution (25° C.) of 35 mass % of nitric acid, was shaken for 30 seconds, was washed (1 minute) with flowing water, and was dried. As a result, a surface-treated metal member was obtained.

Preparation Example 7D (Treatment described in Example 1 of Japanese Unexamined Patent Publication No. 2005-119005)

A commercially available aluminum degreasing agent "NE-6 (manufactured by Meltex Inc.)" was dissolved in water at a concentration of 15%, and the temperature thereof was controlled to 75° C. The aluminum plate was dipped in an aluminum degreasing bath containing this aqueous solution for 5 minutes and washed with water, and then was dipped in an aqueous solution of 1% of hydrochloric acid at 40° C. for 1 minute and washed with water. Next, the aluminum plate was dipped in a bath containing an aqueous solution of 1% of sodium hydroxide at 40° C. for 1 minute and washed with water. Next, the aluminum plate was dipped in a bath containing an aqueous solution of 1% of hydrochloric acid at 40° C. for 1 minute and washed with water, was dipped in a first hydrazine treatment bath containing an aqueous solution of 2.5% of hydrazine monohydrate at 60° C. for 1 minute, and was dipped in a second hydrazine treatment bath containing an aqueous solution of 0.5% of hydrazine monohydrate at 40° C. for 0.5 minute and washed with water. The aluminum plate was dried with warm air at 40° C. for 15 minutes and at 60° C. for 5 minutes. As a result, a surface-treated metal member was obtained.

Figure 16:
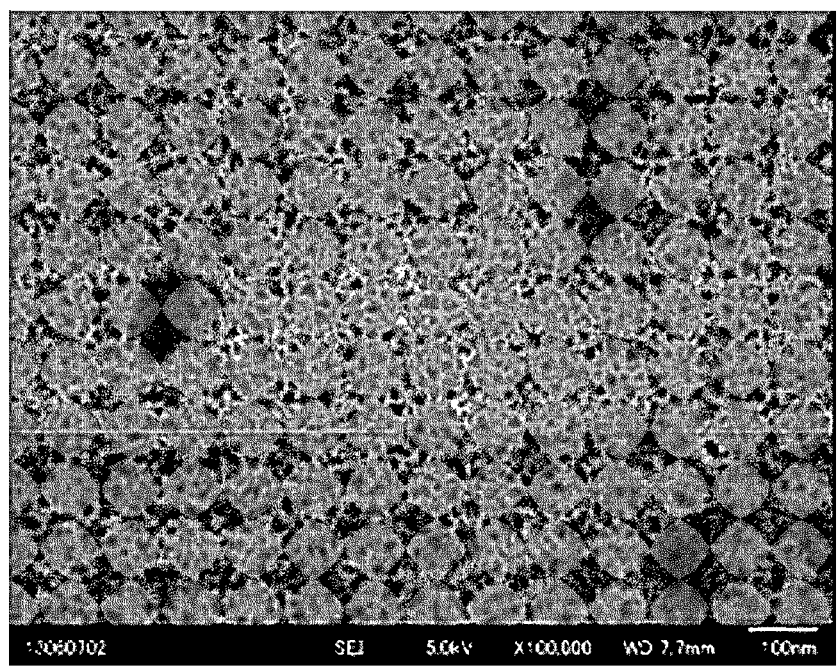
FIG. 16 is an electron micrograph showing an enlarged view of a surface of an aluminum plate obtained in Preparation Example 7D.

The surface of the surface-treated metal member was observed using a scanning electron microscope (manufactured by JEOL Ltd., Model No. JSM-6701F) at a magnification of 100000 times. FIG. 16 shows a micrograph.

Example 1D

Using an applicator, the aluminum plate prepared in Preparation Example 1D was coated with a water-based coating material such that the thickness of a dried coating film was 40 μm, and the aluminum plate was dried in an oven at 120° C. As a result, a coated metal member was obtained. As the coating material, a water-dispersible polyolefin (CHEMIPEARL (trade name) 5300, manufactured by Mitsui Chemicals Inc.) was used. Table 2D shows the evaluation results of the adhesion.

Example 2D

A coated metal member was obtained using the same method as that of Example 1D, except that the aluminum plate prepared in Preparation Example 2D was installed instead of the aluminum plate prepared in Preparation Example 1D. Table 2D shows the evaluation results of the adhesion.

Example 3D

A coated metal member was obtained using the same method as that of Example 1D, except that, as the coating material, a water-dispersible polyolefin (CHEMIPEARL (trade name) M200, manufactured by Mitsui Chemicals Inc.; low density polyethylene) was used instead of the water-dispersible polyolefin (CHEMIPEARL (trade name) 5300, manufactured by Mitsui Chemicals Inc.; ionomer). Table 2D shows the evaluation results of the adhesion.

Example 4D

A coated metal member was obtained using the same method as that of Example 1D, except that, as the coating material, a water-dispersible polyolefin (CHEMIPEARL (trade name) W310, manufactured by Mitsui Chemicals Inc.; low molecular weight polyethylene) was used instead of the water-dispersible polyolefin (CHEMIPEARL (trade name) 5300, manufactured by Mitsui Chemicals Inc.; ionomer). Table 2D shows the evaluation results of the adhesion.

Example 5D

A coated metal member was obtained using the same method as that of Example 1D, except that the aluminum plate prepared in Preparation Example 3D was installed instead of the aluminum plate prepared in Preparation Example 1D. Table 2D shows the evaluation results of the adhesion.

Comparative Example 1D

An aluminum plate (thickness: 1 mm) of Alloy No. 5052 defined in JIS H4000 was cut into a length of 150 mm and a width of 75 mm. Using an applicator, the aluminum plate was coated with a water-based coating material such that the thickness of a dried coating film was 40 μm, and the aluminum plate was dried in an oven at 120° C. As a result, a coated metal member was obtained. As the coating material, a water-dispersible polyolefin (CHEMIPEARL (trade name) 5300, manufactured by Mitsui Chemicals Inc.; ionomer) was used. Table 2D shows the evaluation results of the adhesion.

Comparative Example 2D

A coated metal member was obtained using the same method as that of Example 1D, except that the aluminum plate prepared in Preparation Example 4D was installed instead of the aluminum plate prepared in Preparation Example 1D. Table 2D shows the evaluation results of the adhesion.

Comparative Example 3D

A coated metal member was obtained using the same method as that of Example 1D, except that the aluminum plate prepared in Preparation Example 5D was installed instead of the aluminum plate prepared in Preparation Example 1D. Table 2D shows the evaluation results of the adhesion.

Comparative Example 4D

A coated metal member was obtained using the same method as that of Example 1D, except that the aluminum plate prepared in Preparation Example 6D was installed instead of the aluminum plate prepared in Preparation Example 1D. Table 2D shows the evaluation results of the adhesion.

Comparative Example 5D

A coated metal member was obtained using the same method as that of Example 1D, except that the aluminum plate prepared in Preparation Example 7D was installed instead of the aluminum plate prepared in Preparation Example 1D. Table 2D shows the evaluation results of the adhesion.

TABLE 1D

| | Etching Process | Etching Amount [μm] |
|---|---|---|
| Preparation Example 1D | Acidic Etchant B → Washing with Water | 20 |
| Preparation Example 2D | Acidic Etchant B → Ultrasonic Cleaning | 20 |
| Preparation Example 3D | Alkaline Etchant → Acidic Etchant B → Washing with Water | 15 |
| Preparation Example 4D | Alkaline Etchant → Washing with Water | 4 |
| Preparation Example 5D | Acidic Etchant B → Alkaline Etchant → Washing with Water | 20 |
| Preparation Example 6D | Acidic Etchant B → Aqueous Sodium Hydroxide Solution → Aqueous Nitric Acid Solution → Washing with Water | 20 |
| Preparation Example 7D | Aqueous Hydrochloric Acid Solution → Aqueous Sodium Hydroxide Solution → Aqueous Hydrochloric Acid Solution → Aqueous Hydrazine Solution → Aqueous Hydrazine Solution → Washing with Water | 0.05 |

TABLE 2D

| | Water-Based Coating Material | Particle Size [μm] | Etching Method | Adhesion |
|---|---|---|---|---|
| Example 1D | CHEMIPEARL S300 (Manufactured by Mitsui Chemicals Inc.) | 0.5 | Preparation Example 1D | 0 |
| Example 2D | CHEMIPEARL S300 (Manufactured by Mitsui Chemicals Inc.) | 0.5 | Preparation Example 2D | 0 |
| Example 3D | CHEMIPEARL M200 (Manufactured by Mitsui Chemicals Inc.) | 6 | Preparation Example 1D | 0 |
| Example 4D | CHEMIPEARL W310 (Manufactured by Mitsui Chemicals Inc.) | 9.5 | Preparation Example 1D | 0 |
| Example 5D | CHEMIPEARL S300 (Manufactured by Mitsui Chemicals Inc.) | 0.5 | Preparation Example 3D | 0 |
| Comparative Example 1D | CHEMIPEARL S300 (Manufactured by Mitsui Chemicals Inc.) | 0.5 | Not Treated | 2 |
| Comparative Example 2D | CHEMIPEARL S300 (Manufactured by Mitsui Chemicals Inc.) | 0.5 | Preparation Example 4D | 1 |
| Comparative Example 3D | CHEMIPEARL S300 (Manufactured by Mitsui Chemicals Inc.) | 0.5 | Preparation Example 5D | 1 |

TABLE 2D-continued

|  | Water-Based Coating Material | Particle Size [μm] | Etching Method | Adhesion |
|---|---|---|---|---|
| Comparative Example 4D | CHEMIPEARL S300 (Manufactured by Mitsui Chemicals Inc.) | 0.5 | Preparation Example 6D | 2 |
| Comparative Example 5D | CHEMIPEARL S300 (Manufactured by Mitsui Chemicals Inc.) | 0.5 | Preparation Example 7D | 2 |

In Example 1D, as shown in FIG. 12, a concavo-convex portion having a sharp angle was formed on the surface of the metal member 103 treated in Preparation Example 1D, and it is considered that, by the coating resin (resin member 105) formed of the water-dispersed polyolefin being inserted into the concavo-convex portion, the obtained coated metal member obtained high adhesion.

In Example 2D, the metal member treated in Preparation Example 1D was further washed by ultrasonic cleaning (in water, one minute) in Preparation Example 2D. Due to the above treatment, smut and the like formed on the metal surface can be removed. Therefore, as shown in FIG. 13, a concavo-convex portion having a sharp angle was formed on the surface of the metal member 103, and it is considered that, by the coating resin formed of the water-dispersed polyolefin being inserted into the concavo-convex portion, the obtained coated metal member obtained high adhesion.

In Example 3D, the low density polyethylene (CHEMIPERAL M200 (trade name) manufactured by Mitsui Chemicals Inc.) having a large particle size was used instead of the ionomer (CHEMIPERAL 5300 (trade name) manufactured by Mitsui Chemicals Inc.) used in Example 1D, but high adhesion was obtained as in the case of Example 1D.

In addition, in Example 4D, the low molecular weight polyethylene (CHEMIPERAL W310 (trade name) manufactured by Mitsui Chemicals Inc.) having a large particle size was used instead of the ionomer (CHEMIPERAL 5300 (trade name) manufactured by Mitsui Chemicals Inc.) used in Example 1D, but high adhesion was obtained as in the case of Example 1D.

In Example 5D, the same method as that of Example 1D was performed using the metal member 103 obtained in Preparation Example 3D which was surface-roughened using the acidic etchant B after being treated using the alkaline etchant, but the obtained coated metal member obtained as high adhesion as the adhesion in Example 1D.

On the other hand, in Comparative Example 1D, the resin coating formed of the water-dispersible polyolefin was formed without performing the surface treatment. As a result, somewhat high adhesion was obtained but was not sufficient.

In Comparative Example 2D, as shown in FIG. 12, a concavo-convex portion having a sufficient size was not formed on the surface of the metal member treated in Preparation Example 4D, and the obtained coated metal member obtained low adhesion.

In Comparative Example 3D, the metal member, which was treated with the alkaline etchant after being etched using the acidic etchant B in Preparation Example 5D, was used. In Comparative Example 4D, the metal member, which was treated using the aqueous sodium hydroxide solution and the aqueous nitric acid solution after being etched using the acidic etchant B in Preparation Example 6D, was used. It is assumed that, as shown in FIG. 12, a concavo-convex portion having a sharp angle was formed on the surface of the metal member due to the treatment using the acidic etchant B. However, it is considered that the concavo-convex portion deteriorated due to the treatment using the alkaline etchant or sodium hydroxide, and low adhesion was obtained.

In Comparative Example 5D, as shown in FIG. 16, a concavo-convex portion having a sufficient size was not formed on the surface of the metal member treated in Preparation Example 7D, and the obtained coated metal member obtained low adhesion.

As described above, in the metal-resin composite structure 106 according to the present invention, the metal member 103 and the resin member 105 are integrated to each other without being easily peeled off, and a high bond strength can be obtained.

The metal-resin composite structure 106 according to the present invention can be realized in various shapes using a relatively simple method. Therefore, the contribution of the present invention to the development of the industry is significant.

This application claims priority based on Japanese Unexamined Patent Application No. 2013-149031, filed on Jul. 18, 2013, Japanese Unexamined Patent Application No. 2013-166751, filed on Aug. 9, 2013, Japanese Unexamined Patent Application No. 2013-235731, filed on Nov. 14, 2013, and Japanese Unexamined Patent Application No. 2014-138787, filed on Jul. 4, 2014, the entire contents of which are incorporated herein by reference.

The present invention includes the following aspects.

[A1]

A metal-resin composite structure obtained by bonding a metal member, which is formed of a metal material containing aluminum and is surface-roughened, and a resin member, which is formed of a resin composition containing a polyolefin resin, to each other, in which the surface-roughening of the metal member is performed using an acidic etchant, the surface-roughening using the acidic etchant is performed in a final step of the surface-roughening process of the metal member, and the acidic etchant contains at least either ferric ions or cupric ions and an acid.

[A2]

The metal-resin composite structure according to [A1], in which the metal member is washed by ultrasonic cleaning after the surface-roughening process of the metal member.

[B1]

A metal-resin composite structure obtained by bonding a metal member, which is formed of a metal material containing aluminum and is surface-roughened, and a resin member, which is formed of a resin composition containing a thermoplastic resin having a glass transition temperature of higher than or equal to 140° C., to each other, in which the surface-roughening of the metal member is performed using an acidic etchant, the surface-roughening using the acidic etchant is performed in a final step of the surface-roughening process of the metal member, and the acidic etchant contains at least either ferric ions or cupric ions and an acid.

[B2]

A metal-resin composite structure obtained by bonding a metal member, which is formed of a metal material containing aluminum and is surface-roughened, and a resin member, which is formed of a resin composition containing an amorphous thermoplastic resin, to each other, in which the surface-roughening of the metal member is performed using an acidic etchant, the surface-roughening using the acidic etchant is performed in a final step of the surface-roughening process of the metal member, and the acidic etchant contains at least either ferric ions or cupric ions and an acid.

[B3]

The metal-resin composite structure according to [B1] or [B2], in which the metal member is washed by ultrasonic cleaning after the surface-roughening process of the metal member.

[B4]

The metal-resin composite structure according to [B3], in which the metal member is washed by ultrasonic cleaning after the surface-roughening process of the metal member.

[C1]

A coated metal member obtained by forming a coating film on a surface of a metal member which is formed of a metal material containing aluminum and is surface-roughened, in which the surface-roughening of the metal member is performed using an acidic etchant, the surface-roughening using the acidic etchant is performed in a final step of the surface-roughening process of the metal member, and the acidic etchant contains at least either ferric ions or cupric ions and an acid.

[C2]

A method of preparing the coated metal member according to [C1], including coating a surface of the metal member with a water-based coating material to form a coating film on the surface of the metal member.

The invention claimed is:

1. A metal-resin composite structure which is obtained by bonding a metal member and a resin member formed of a thermoplastic resin composition to each other,
wherein the thermoplastic resin composition constituting the resin member is infiltrating into a concavo-convex portion formed on a surface of the metal member and the metal member is bonded to the resin member by etching the metal member in a depth direction and, as a result, the metal member and the resin member are integrated to each other,
wherein the metal member is selected from the group consisting of an iron member, a stainless steel member, an aluminum member, an aluminum alloy member, a magnesium member and a magnesium alloy member,
wherein regarding six linear portions in total on the surface of the metal member including three arbitrary linear portions which are parallel to each other and another three arbitrary linear portions which are perpendicular to the former three linear portions, a surface roughness measured according to JIS B0601:2001 (corresponding international standard: ISO4287) satisfies the following requirements (1), (2), and (3) at the same time:
(1) material ratio of the roughness profile (Rmr) of two or more of the linear portions at a cutting level of 20% and an evaluation length of 4 mm are lower than or equal to 30%;
(2) ten point average roughnesses (Rzjis) of all the linear portions at an evaluation length of 4 mm are greater than 5 µm; and
(3) material ratio of the roughness profile (Rmr) of two or more of the linear portions at a cutting level of 40% and an evaluation length of 4 mm are lower than or equal to 60%
wherein as the six linear portions, a center line B1 which passes through a center portion of a bonding portion surface, which is bonded to the resin member, of the metal member, lines B2 and B3 parallel to the center line B1, a center line B4 perpendicular to the center line B1, and lines B5 and B6 perpendicular to the center line B1 and parallel to the center line B4 are selected, and vertical distances between the adjacent lines in the lines B1, B2, B3, B4, and B6 are within the range of 2 mm to 5 mm, respectively,
wherein an average value of the material ratio of the roughness profile (Rmr) on the surface of the metal member at a cutting level of 20% and an evaluation length of 4 mm is higher than or equal to 0.1% and less than or equal to 40%, and
wherein an average value of the ten point average roughnesses (Rzjis) on the surface of the metal member is greater than 5 µm and less than or equal to 45 µm.

2. The metal-resin composite structure according to claim 1,
wherein regarding the six linear portions in total on the surface of the metal member including three arbitrary linear portions which are parallel to each other and another three arbitrary linear portions which are perpendicular to the former three linear portions, the ten point average roughnesses (Rzjis) of all the linear portions are greater than or equal to 15 µm.

3. The metal-resin composite structure according to claim 1,
wherein regarding the six linear portions in total on the surface of the metal member including three arbitrary linear portions which are parallel to each other and another three arbitrary linear portions which are perpendicular to the former three linear portions, the surface roughness measured according to JIS B0601: 2001 (corresponding international standard: ISO4287) further satisfies the following requirement (4):
(4) mean width of the profile elements (RSm) of all the linear portions are greater than 10 µm and less than 300 µm.

4. The metal-resin composite structure according to claim 1,
wherein the surface of the metal member is roughened,
the roughening is performed using an acidic etchant in a final step of the roughening process of the metal member, and
the acidic etchant contains at least either ferric ions or cupric ions and an acid.

5. The metal-resin composite structure according to claim 4,
wherein the metal member is washed by ultrasonic cleaning after the roughening process.

6. The metal-resin composite structure according to claim 1,
wherein the metal member is selected from the group consisting of an aluminum member and an aluminum alloy member.

7. The metal-resin composite structure according to claim 1, wherein the thermoplastic resin composition contains a thermoplastic resin selected from the group consisting of polyolefin resins, polyester resins, polyamide resins, and mixtures thereof.

8. The metal-resin composite structure according to claim 1,
wherein the thermoplastic resin composition contains a thermoplastic resin selected from the group consisting of polycarbonate resins, polyether ether ketone resins, polyether ketone resins, polyimide resins, polyether sulfone resins, and mixtures thereof, all of which have a glass transition temperature of higher than or equal to 140° C.

9. The metal-resin composite structure according to claim 1,
wherein the thermoplastic resin composition contains an amorphous thermoplastic resin selected from the group consisting of polystyrene resins, polyacrylonitrile resins, styrene-acrylonitrile copolymer resins, acrylonitrile-butadiene-styrene copolymer resins, polymethyl methacrylate resins, polycarbonate resins, and mixtures thereof.

10. The metal-resin composite structure according to claim 1,
wherein the resin member is a coating film.

11. The metal-resin composite structure according to claim 10,
wherein the coating film is obtained by coating the surface of the metal member with a water-based coating material.

* * * * *